(12) United States Patent
Xie et al.

(10) Patent No.: US 6,503,620 B1
(45) Date of Patent: Jan. 7, 2003

(54) MULTILAYER COMPOSITE PSA CONSTRUCTIONS

(75) Inventors: Li Xie, Painesville, OH (US); Jesse C. Ercillo, Corina, CA (US); Yukihiko Sasaki, Claremont, CA (US); Kyung W. Min, Mentor, OH (US); Chan U. Ko, Arcadia, CA (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 09/429,982

(22) Filed: Oct. 29, 1999

(51) Int. Cl.⁷ ............................. B32B 7/12; C09J 7/02
(52) U.S. Cl. ............... 428/354; 428/40.1; 428/41.9; 428/323; 428/355 AC; 428/355 BL; 427/208.4; 427/208.8
(58) Field of Search .................... 428/40.1, 41.5, 428/41.9, 323, 354, 355 AC, 355 BL; 427/208.4, 208.8

(56) References Cited

U.S. PATENT DOCUMENTS

| | | | |
|---|---|---|---|
| 4,223,067 A | 9/1980 | Levens | 428/308 |
| 4,415,615 A | 11/1983 | Esmay et al. | 428/40 |
| 4,543,139 A | 9/1985 | Freedman et al. | 156/152 |
| 4,710,536 A | 12/1987 | Klingen et al. | 524/493 |
| 4,720,416 A * | 1/1988 | Duncan | 428/195 |
| 4,748,061 A | 5/1988 | Vesley | 428/40 |
| 4,855,170 A | 8/1989 | Darvell et al. | 428/40 |
| 4,894,259 A | 1/1990 | Kuller | 427/208.8 |
| 4,895,745 A | 1/1990 | Vesley et al. | 428/40 |
| 4,950,537 A | 8/1990 | Vesley et al. | 428/345 |
| 5,100,728 A | 3/1992 | Plamthottam et al. | 428/345 |
| 5,221,706 A | 6/1993 | Lee et al. | 524/156 |
| 5,290,842 A | 3/1994 | Sasaki et al. | 524/271 |
| 5,385,772 A | 1/1995 | Slovinsky et al. | 428/220 |
| 5,558,913 A | 9/1996 | Sasaki et al | 428/41.5 |
| 5,593,759 A * | 1/1997 | Vargas et al. | 428/200 |
| 5,718,958 A | 2/1998 | Scholz et al. | 428/40.1 |
| 5,728,430 A | 3/1998 | Sartor et al. | 427/356 |
| 5,827,609 A | 10/1998 | Ercillo et al. | 428/354 |

FOREIGN PATENT DOCUMENTS

| | | |
|---|---|---|
| EP | 638096 | 4/1993 |
| EP | 781198 | 9/1995 |
| WO | 9733748 | 9/1997 |

OTHER PUBLICATIONS

PCT/US00/26008; PCT International Search Report mailed Jan. 16, 2001.

* cited by examiner

Primary Examiner—Daniel Zirker
(74) Attorney, Agent, or Firm—Renner, Otto, Boisselle & Sklar, LLP (57) ABSTRACT

The present invention relates to improved performance multilayer PSA constructions useful for making labels. In one embodiment the invention relates to a multilayer PSA construction comprising: (A) a multilayer adhesive laminate having an overall thickness of less than about 100 microns and comprising (I) at least one composite PSA layer comprising a continuous phase of a pressure sensitive adhesive and a discontinuous phase of non-adhesive filler particles, filler particle aggregate, or a mixture thereof, and (ii) at least one second PSA layer which is in contact with the composite layer and contains no filler or less filler than the composite layer, and (B) a facestock which is in contact with and adhered to either the composite layer or the second PSA layer of the multilayer adhesive laminate.

38 Claims, 3 Drawing Sheets

MULTILAYER COMPOSITE PSA CONSTRUCTIONS

FIELD OF THE INVENTION

The present invention relates to composite multilayer constructions, and more particularly, to multilayer pressure-sensitive adhesive constructions for labels comprising two or more adhesive layers.

BACKGROUND OF THE INVENTION

The pressure-sensitive adhesive (PSA) label industry is unique and different from the tape industry in terms of materials, manufacturing conditions, product and product applications. PSA label products generally comprise a release liner coated with a low surface energy material such as silicone, a PSA layer disposed onto the liner, and a facestock adhesively bonded to the PSA layer. Such PSA label constructions may be formed by first coating or laminating the PSA to the release surface of the liner and then adhering the facestock to the PSA-coated liner; or alternatively, by coating or laminating the PSA to the facestock and then contacting the PSA-coated facestock with the release coated liner. The facestock is characteristically made from a web or sheet of paper or plastic, which can be printed with information or other indicia either before or after it is laminated to the PSA layer.

In a typical process for "converting" the label construction, the facestock is printed, the facestock and adhesive die-cut down to the liner surface to outline the label shape, and the waste material between the labels (matrix) is removed by stripping. The PSA label facestock and the adhesive is then adhered to a substrate surface by separating the label from the liner and causing the PSA layer of the label to come into contact with the substrate surface. In the most popular labeling process, the label is separated from the release liner by bending the liner back over a peel plate, whereupon the label is sufficiently stiff to cause the label to continue on a straight path toward the desired substrate surface.

As used in this patent application, "separation" refers to removal of the label from the liner; "application" refers to adhesion of the label to the substrate surface; and "dispensing" or "dispensability" refers to the combined steps of separation and application. "Peel plate dispensing" denotes the use of a peel plate in the separation of the liner from the label.

The PSA label performance is primarily dominated by the ability of the adhesive to wet the application substrate to establish adequate surface contact and bonding strength between the adhesive and the substrate when they are brought into contact. These desirable results are accomplished by the visco-elastic properties and the surface chemistry of the adhesive. The adhesive may be chosen to provide a strong interfacial interaction with a wide variety of substrates and surfaces (e.g., low energy, high energy, polar or non-polar surfaces). It is also desirable that the adhesive exhibit a viscous nature at low deformation frequencies (e.g., $10^{-1}$ to $10^1$ Hz) during label dispensing applications so that, under pressure, the adhesive is able to flow or wet the substrate in order to have adequate adhesive-substrate interfacial contact to establish bonding. At higher deformation frequencies (e.g., $10^3$ to $10^6$ Hz) during label conversion, however, the adhesive must exhibit an elastic nature so that the adhesive can be cut evenly by the converting die.

Fillers are particulate additives which can be added to adhesives to increase the bulk of the adhesive and/or to improve properties. Fillers are commonly used in adhesive formulations for the following major reasons: (1) for cost reduction such as by adding calcium carbonate, clay or talc; (2) for coloring the adhesives such as by the addition of titanium dioxide, colored toner and security taggants; and (3) for performance enhancement such as by increasing stiffness and tensile strength, reducing cold flow, reducing edge flow, improved cutting, etc. Filler particles may be either inert-non-reinforcing fillers or active-reinforcing fillers. Inert-non-reinforcing fillers or extenders are fillers that do not strongly interact with the adhesive polymer resin. Examples include untreated clay, talc, calcium carbonate and titanium dioxide. They are usually included in the adhesive to increase adhesive bulk, reduce the cost, or change the appearance or chemical resistance of the adhesive. Such fillers also improve the handleability of the polymer resin mixture. The active-reinforcing fillers are those which interact with the adhesive polymer resin by promoting, for example, additional cross-linking or filler-polymer interface interaction. Examples of such fillers include surface-treated clay, zinc oxide, fine particle size silica and carbon black. The reinforcement is usually defined in terms of an increase in mechanical properties such as tensile strength or modulus, and occasionally, adhesion properties.

In tape applications where the adhesive layer is thick and may be in the range of from a few hundred microns to a few thousand microns in thickness, fillers are commonly used to obtain benefits such as lower cost and higher stiffness.

In the thin coatings utilized in label applications (generally under 100 microns in thickness), however, large amounts of fillers will cause significant loss of tack. Therefore, the amount of filler used in label applications is limited. Adhesive performance and anchorage to the facestock may suffer significantly by the inclusion of only moderate amounts of added fillers. For example, the addition of fillers to thin PSA films generally results in a decided deadening effect.

SUMMARY OF THE INVENTION

The present invention relates to improved performance multilayer PSA constructions useful for making labels. In one embodiment, the invention relates to a multilayer PSA construction comprising:

(A) a multilayer adhesive laminate having an overall thickness of less than about 100 microns and comprising
  (i) at least one composite PSA layer comprising a continuous phase of a pressure-sensitive adhesive and a discontinuous phase of non-adhesive filler particles, filler particle aggregate, or a mixture thereof, and
  (ii) at least one second PSA layer which is in contact with the composite layer and contains no filler or less filler than the composite layer, and
(B) a facestock which is in contact with and adhered to either the composite layer or the second PSA layer of the multilayer adhesive laminate. Preferably, the overall thickness of the multilayer adhesive laminate is from about 5 to about 75 microns, and the composite pressure-sensitive adhesive layer contains from about 5 to about 500 phr of filler. In other embodiments, the multilayer PSA label constructions also comprise a release liner in contact with the adhesive layer which is not in contact with the facestock. The proper distribution of the filler between the two or more PSA layers, and, more particularly, the inclusion of the filler in only one of the two PSA layers improves the performance of the adhesive such as by improved adhesion to the facestock or a substrate, adhesive drying rate, and label converting capabilities (e.g., improved cutting).

Die-cut labels also are described which are prepared by die-cutting the die-cuttable and matrix-strippable adhesive composite constructions of the invention, particularly those constructions described herein which comprise a multilayer PSA label construction in combination with a substrate having a release surface such as a release liner.

DETAILED DESCRIPTION OF THE PREFERRED EMBODIMENTS OF THE INVENTION

In one embodiment, the invention relates to a multilayer PSA construction comprising:
(A) a multilayer adhesive laminate having an overall thickness of less than about 100 microns and comprising
   (i) at least one composite PSA layer comprising a continuous phase of a PSA and a discontinuous phase of non-adhesive filler particles, filler particle aggregates, or a mixture thereof, and
   (ii) at least one second PSA layer which is in contact with the composite layer and contains no filler or less filler than the composite layer, and
(B) a facestock which is in contact with and adhered to either the composite layer or the second PSA layer of the multilayer adhesive laminate.

It has been found that the use of the multilayer PSA construction of the present invention results in improved adhesion of the composite layer by using the second PSA layer to contact the facestock of the label construction or an application substrate. The presence of the filler in the composite PSA layer also provides a range of benefits including one or more of the following: high speed drying, improved converting, improved die-cuttability, low cost, high stiffness, low edge flow, high opacity, and/or specialty application enhancement. The improvements in properties is evident when the multilayer PSA label constructions of the present invention are compared to single layer PSA label constructions.

Figure 1:
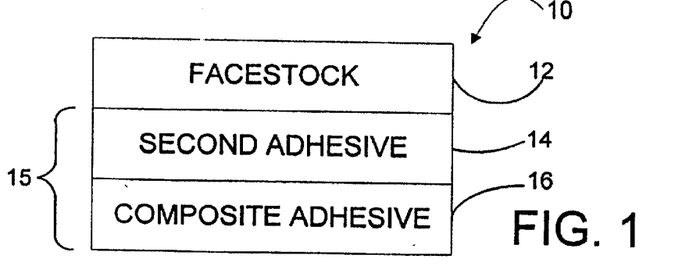
FIG. 1 is a schematic illustration of a side view of a label construction of the present invention.

FIG. 1 is a schematic illustration of a side view of a label construction 10 of the present invention. The label construction 10 illustrated in FIG. 1 comprises a composite adhesive layer 16 having an upper surface and a lower surface; a second adhesive layer 14 having an upper surface and a lower surface wherein the lower surface of the second adhesive layer 14 is in contact with the upper surface of the composite adhesive layer 16; and a facestock 12 having an upper surface and a lower surface wherein the lower surface of the facestock 12 is in contact with the upper surface of the second adhesive layer 14. In the embodiment illustrated in FIG. 1, the second adhesive layer 14 of FIG. 1 which is between the facestock 12 and the upper surface of the composite adhesive layer 16 is sometimes referred to herein as "an anchor layer" or the "face side adhesive" or "FSA". The composite adhesive layer 16 in FIG. 1 is sometimes referred to herein as the "liner side adhesive" or LSA since a release liner may be adhered to the lower surface of the composite adhesive layer 16. (See for example FIG. 4 discussed below). The second adhesive layer 14 (FSA) in FIG. 1 improves the anchorage of the composite layer to the facestock because it contains a smaller amount of filler or no filler. The two adhesive layers 14 and 16, together comprise the multilayer adhesive laminate 15 of this embodiment. The term "laminate" as used in the phrase "multilayer adhesive laminate" in the present written description and appended claims refers to the product and not to any method of manufacture. That is, the multilayer adhesive portion of the construction may be prepared by any procedure known to those skilled in the art such as by lamination of two or more preformed layers, simultaneous or sequential deposition of two or more layers from hot-melt, solution, or emulsion adhesive formulations on a substrate, etc. When the second adhesive layer 14 is in contact with the lower surface of the composite layer 16, as in FIG. 2, the second layer 26 is sometimes referred to as a "surface layer".

Figure 2:
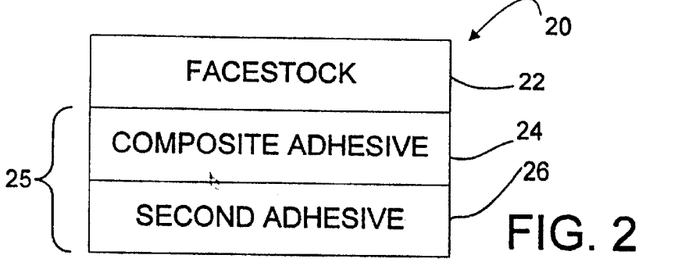
FIG. 2 is a schematic illustration of a side view of another embodiment of the label construction of the present invention.

FIG. 2 is a schematic illustration of a side view of another embodiment of the label construction of the present invention. The label construction 20 of FIG. 2 comprises a second adhesive layer 26 having an upper surface and a lower surface; a composite adhesive layer 24 having an upper surface and a lower surface wherein the lower surface is in contact with the upper surface of the second adhesive layer 26; and a facestock 22 having an upper surface and a lower surface wherein the lower surface of the facestock 22 is in contact with the upper surface of the composite adhesive layer 24. In this embodiment, the second adhesive layer containing a reduced amount of filler or no filler may initially provide a bonding surface to a liner and ultimately to an application substrate. The embodiment shown in FIG. 2 results in improved adhesion to an application substrate by virtue of the use of the second adhesive layer which contains no filler or only a small amount of filler. The second adhesive layer in this embodiment is sometimes referred to herein as the "surface layer" or when a release liner is present, the "liner side adhesive" or LSA. The combination of composite adhesive layer 24 and the second adhesive layer 26 comprises the multilayer adhesive laminate 25 of this embodiment.

Figure 3:
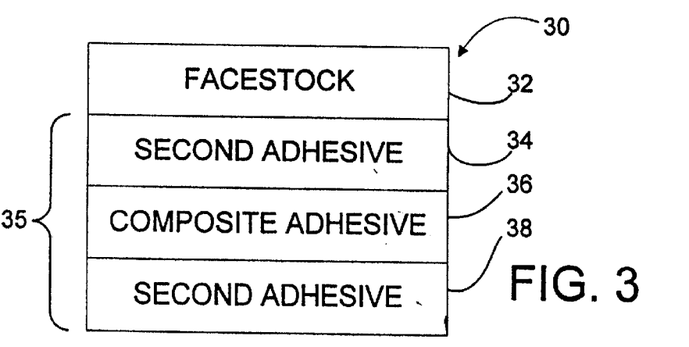
FIG. 3 is a schematic illustration of a side view of yet another embodiment of the present invention.

FIG. 3 is a schematic illustration of a side view of yet another embodiment of the present invention which contains two second adhesive layers. More particularly, the label construction 30 comprises a second adhesive layer 38 (surface layer) having an upper surface and a lower surface; a composite adhesive layer 36 having an upper and lower surface wherein the lower surface of the composite adhesive layer 36 is in adhesive contact with the upper surface of the second adhesive layer 38; a second adhesive layer 34 (anchor layer) having an upper surface and a lower surface wherein the lower surface is in adhesive contact with the upper surface of the composite adhesive layer 36; and a facestock 32 having an upper surface and a lower surface wherein the lower surface of the facestock 32 is in adhesive contact with the second adhesive layer 34. The composite adhesive laminate 35 of this embodiment comprises the composite adhesive layer 36 and the two second adhesive layers 34 and 38. In another further embodiment, not shown in FIG. 3, the lower surface of the second adhesive layer 38 may be in contact with a release liner. In the embodiment shown in FIG. 3, the second adhesive layer 34 (anchor layer) provides improved adhesion to the facestock 32, and the second adhesive layer 38 (surface layer) provides improved adhesion to either a release liner (not shown) or an application substrate (not shown).

The multilayer adhesive laminates utilized in the multilayer PSA label constructions of the present invention comprise, as mentioned above, at least one composite PSA layer and at least one second PSA layer. The overall thickness of the multilayer adhesive laminate is generally less than about 100 microns, more often, less than about 75 microns, and preferably less than about 50 microns. In one preferred embodiment, the overall thickness of the multilayer adhesive laminate is from about 5 to about 75 microns, and in another embodiment is from about 5 to about 50 microns.

The second PSA layer or layers included in the multilayer adhesive laminates in the PSA label constructions of the present invention may be of any thickness. The thickness of the second PSA layer may be greater than, the same, or less than the thickness of the composite PSA layer. It is presently preferred in one embodiment that the thickness of the second PSA layer or layers be less than the thickness of the composite PSA layer. Thus, the thickness of the second PSA layer may range from about 1 to about 75 microns but is preferably from about 1 to about 50 microns and more preferably from about 1 to about 25 microns.

As noted, the composite PSA layer of the multilayer PSA label constructions of the invention generally comprises a continuous phase of a PSA and a discontinuous phase of non adhesive filler particles, filler particle aggregates, or a mixture of filler particles and filler particle aggregates. Mixtures of two or more different filler particles can be used in each of the adhesive layers, and mixtures of particle sizes can also be used in each of the layers. The amount of filler or filler aggregates included in the composite layer may vary over a wide range depending upon the desired properties of the composite. In one embodiment, the composite PSA layer may contain from about 1 to about 500 phr (parts by weight of filler per 100 parts by weight of PSA). In another embodiment, the composite PSA adhesive layer may contain from about 5 to 100 phr of filler. Unless otherwise indicated in the written description and the appended claims of the present application, all parts and percentages are by weight, and temperatures are in degrees centigrade.

The second PSA layer or layers may be free of or substantially free of filler particles or aggregates, or may contain lesser amounts of filler than the composite layer. The filler, when present in the second PSA layer, may be the same as or different from the filler in the composite layer. In a preferred embodiment, the second PSA layer contains from 0 to 20 phr of filler, and in most preferred embodiment at the present time, the second PSA adhesive layer is free or substantially free of filler or filler aggregates. Substantially free means that the second PSA layer may contain very small amounts, for example, up to about 0.5 phr of filler as, for example, impurities, etc.

The particle size of the fillers or filler aggregates dispersed in the composite PSA layer may range from between about 0.005 to about 50 microns. In a preferred embodiment, the particle size of the filler or filler aggregates may range from about 0.01 to about 20 microns, and in a further preferred embodiment, the particle size may range from about 0.01 to about 5 microns. The thickness of the composite PSA layer may range from about 1 to about 50 microns and more often from about 5 to about 25 microns.

The fillers and filler aggregates that may be included in the PSA layers of the present invention may be selected from a variety of fillers, and, in some instances, the selection of the filler may depend upon a desired property such as opacity, color, stiffness, cohesive strength, etc. The fillers may be organic or inorganic particles which are non-adhesives. The particles may be hollow or solid throughout. The organic particulate solids useful as fillers in the adhesive system of the present invention preferably are compositions that are divisible into discrete particles of appropriate size and are free flowing at the temperature(s) employed when the solids are being combined with the adhesive material. Such solids further must be inert to the adhesive matrix and any precursor thereof that contacts the solids. Particulate organic polymer compositions that provide to the adhesive system the advantages of the present invention include polyethylene, polyvinyl acetate, polyvinyl alcohol, cellulose, polyacrylamide, partially hydrolyzed polyacrylamide, ethylene-vinyl acetate copolymers, styrene-butadiene copolymers, styrene-acrylonitrile copolymers and the like. Organic polymers of sufficient molecular weight and of appropriate composition to be inert to a prepolymerized mass of pressure-sensitive adhesive material, such as the above-noted polymers, are particularly preferred. Examples of hollow polymeric microspheres include hollow styrene-acrylic copolymer microspheres (0.5 or 1.0 micron diameter) available from Rohm and Haas under the trade designation "Ropaque".

It is desirable to select a filler that is available commercially in a form that requires no processing prior to its incorporation into the support material of the adhesive system. To avoid sieving the organic particulate solids a filler supplied with a fine and fairly uniform grind is desirable. To avoid drying before use, a filler having a low moisture content, preferably less than 1.0 weight percent, is desirable. For instance, a spray-dried polyvinyl acetate powder sold under the tradename Vinac RP-251 by Air Products and Chemical, Inc., has such desirable characteristics.

Other particulate organic fillers can be used in the invention including: particles or fibers of natural materials (e.g., wood flour, sawdust, shell fibers, cotton fibers); particles and fibers of synthetic materials (e.g., regenerated cellulose, polyester, polyvinyl alcohol fibers, rubber dust, styrene-butadiene latex); sugar; corn starch; flour; etc. Useful corn starch is available, e.g., from National Starch Co. under the trade designation "Durabond A" or from the Cerestar Company, Hammond, Ind. under the general trade designation "Cerestar 3460". When the adhesives are prepared as water emulsions, insoluble fillers are used. Thus if starch is to be used as a filler in an emulsion adhesive, a water insoluble form of starch is used.

The inorganic fillers useful in the invention include mineral fillers such as calcium carbonate, kaolin, zinc oxide, titanium dioxide, mica, feldspar, synthetic silicas, natural silica and talc; metallic conductive and magnetic fillers such as aluminum, nickel and copper powders, carbon black, etc.;

flame retardant fillers such as antimony oxide, alumina trihydrate, etc.; spherical fillers such as solid or hollow glass beads, ceramic microspheres, etc. The fillers can be utilized for various reasons such as lower cost (e.g., calcium carbonate, kaolin, talc), softness (e.g., talc, corn starch), increased hiding power (talc), increased opacity of color (e.g., titanium dioxide, colored toners/pigments), higher stiffness (e.g., zinc oxide, fine silica pigment, magnesium oxide, magnesium carbonate etc), and higher cohesive strength (e.g., carbon black, silica, etc.). Fillers can also be used as taggants in some applications (e.g., fluorescence or phosphorescence indicators such as strontium compounds, zinc silicate, zinc cadmium sulfide, etc.), or cosmetic or security purposes, or to modify the electromagnetic properties such as for anti-static or radio frequency radiation shielding (e.g., inorganic salts, graphite, or metal powders). In one embodiment, it is advantageous to use soft inorganic fillers such as those characterized as having a hardness of from 1 to about 3 on the Mohs scale. The use of such fillers results in improved convertibility of the constructions and a longer working life for the cutting tools. Talc has a Mohs rating of 1, and is particularly useful in constructions, (e.g., adhesive label constructions) that are to be die-cut. Examples of commercially available useful fillers include talcs available from Luzenac America Inc. under the general trade designations Nicron® and Silverline™; Dicaperl® hollow glass microspheres available from Grefco Minerals, Inc. under the designations HP110, HP210, HP510 and HP710; and mineral fillers available from Grefco Minerals, Inc. under the general trade designation Dicalite®.

The filler particles can be incorporated homogeneously into an adhesive as discrete phases in the form of individual particles or as aggregates prior to, during, or after the polymerization of the monomers or polymers of the adhesive. Fillers are often originally provided in the form of powder which may require one to prepare a paste with a little water as a first step, but they can also be purchased in slurry form, free-flowing paste, or anhydrous preparations which allow easier distribution in the aqueous adhesive phase. If the adhesive is added to a filler paste, small increments of the adhesive are added. Other techniques such as filtering or vacuuming to reduce bubbles in the adhesive blend also may be utilized. Depending on the viscosity of the adhesive blend, the composite blend may require periodic stirring to maintain the homogeneity of the filler phase in the adhesive during storage and/or prior to coating.

Any pressure-sensitive adhesive can be utilized in the multilayer adhesive laminates which comprise the composite constructions of the present invention. The adhesive(s) in the composite layer(s) may be the same as or different from the adhesive(s) in the second adhesive layer(s). A description of useful pressure-sensitive adhesives may be found in *Encyclopedia of Polymer Science and Engineering*, Vol. 13. Wiley-lnterscience Publishers (New York, 1988). Additional description of useful PSAs may be found in *Encyclopedia of Polymer Science and Technology*, Vol. 1, Interscience Publishers (New York, 1964).

In general, the PSAs used herein may be any of the PSAs described in the above references. In one embodiment of the invention, PSAs comprise natural or synthetic elastomers, or acrylic-based adhesives. The two or more PSA layers used in the adhesive laminate may be of the same composition or they may be different so long as the adhesive layers have sufficient tack to adhere to each other, to the facestock, and optionally to a release liner.

The PSAs in each adhesive layer of the present invention can be acrylic based such as those taught in U.S. Pat. No. 5,164,444 (Bernard, acrylic emulsion), U.S. Pat. No. 5,623,011 (Bernard, tackified acrylic emulsion) and pending U.S. application Ser. No. 08/905,073, filed Jul. 31, 1997. The adhesive can also be rubber-based such as those taught in U.S. Pat. No. 5,705,551 (Sasaki et al, rubber hot melt). It can also be radiation curable mixture of monomers with initiators and other ingredients such as those taught in U.S. Pat. No. 5,232,958 (Ang, UV cured acrylic) and U.S. Pat. No. 5,232,958 (Mallya et al, EB cured). The disclosures of these patents and the pending application as they relate to acrylic adhesives are hereby incorporated by reference. Although the PSAs in some of the examples of the present application are emulsion and hot melt PSAs, other forms such as solvent adhesives may be used since the same physical principles apply.

Commercially available PSAs are useful in the invention. Examples of these adhesives include the hot melt PSAs available from H.B. Fuller Company, St. Paul, Minn. as HM-1597, HL-2207-X, HL-2115-X, HL-2193-X. Other useful commercially available PSAs include those available from Century Adhesives Corporation, Columbus, Ohio. Another useful acrylic PSA comprises a blend of emulsion polymer particles with dispersion tackifier particles as generally described in Example 2 of U.S. patent application Ser. No. 08/905,073, filed Jul. 31, 1997. The polymer is made by emulsion polymerization of 2-ethylhexyl acrylate, vinyl acetate, dioctyl maleate, acrylic and methacrylic comonomers as described in U.S. Pat. No. 5,164,444 by M. Bernard, resulting in the latex particle size of about 0.2 microns in weight average diameters and a gel content of about 60%.

Conventional PSAs, including silicone-based PSAs, rubber-based PSAs, and acrylic-based PSAs are useful. A commercial example of a hot melt adhesive is H2187-01, sold by Ato Findley, Inc., of Wauwatusa, Wis. In addition, rubber based block copolymer PSAs described in U.S. Pat. No. 3,239,478 (Harlan) also can be utilized in the adhesive constructions of the present invention, and this patent is hereby incorporated by a reference for its disclosure of such hot melt adhesives which are described more fully below.

In one embodiment, the composite adhesive layer(s) and/or the second adhesive layer(s) may be formed from an acrylic based polymer. It is contemplated that any acrylic based polymer capable of forming an adhesive layer with sufficient tack to adhere to the facestock, the release liner or to a substrate may function in the present invention. In certain embodiments, the acrylic polymers for the pressure-sensitive adhesive layers include those formed from polymerization of at least one alkyl acrylate monomer containing from about 4 to about 12 carbon atoms in the alkyl group, and present in an amount from about 35–95% by weight of the polymer or copolymer, as disclosed in U.S. Pat. No. 5,264,532 issued to Barnard. Optionally, the acrylic based pressure-sensitive adhesive might be formed from a single polymeric species.

Advantageously, the glass transition temperature of a PSA layer comprising acrylic polymers can be varied by adjusting the amount of polar, or "hard monomers", in the copolymer, as taught by U.S. Pat. No. 5,264,532, incorporated herein by reference. The greater the percentage by weight of hard monomers is an acrylic copolymer, the higher the glass transition temperature. Hard monomers contemplated useful for the present invention include vinyl esters, carboxylic acids, and methacrylates, in concentrations by weight ranging from about zero to about thirty-five percent by weight of the polymer.

In another embodiment, the pressure-sensitive adhesive utilized in the present invention comprise rubber based elastomer materials containing useful rubber based elastomer materials include linear, branched, grafted, or radial block copolymers represented by the diblock structure A—B, the triblock A—B—A, the radial or coupled structures (A—B)$_n$, and combinations of these where A represents a hard thermoplastic phase or block which is non-rubbery or glassy or crystalline at room temperature but fluid at higher temperatures, and B represents a soft block which is rubbery or elastomeric at service or room temperature. These thermoplastic elastomers may comprise from about 75% to about 95% by weight of rubbery segments and from about 5% to about 25% by weight of non-rubbery segments.

The non-rubbery segments or hard blocks comprise polymers of mono- and polycyclic aromatic hydrocarbons, and more particularly vinyl-substituted aromatic hydrocarbons which may be monocyclic or bicyclic in nature. The preferred rubbery blocks or segments are polymer blocks of homopolymers or copolymers of aliphatic conjugated dienes. Rubbery materials such as polyisoprene, polybutadiene, and styrene butadiene rubbers may be used to form the rubbery block or segment. Particularly preferred rubbery segments include polydienes and saturated olefin rubbers of ethylene/butylene or ethylene/propylene copolymers. The latter rubbers may be obtained from the corresponding unsaturated polyalkylene moieties such as polybutadiene and polyisoprene by hydrogenation thereof.

The block copolymers of vinyl aromatic hydrocarbons and conjugated dienes which may be utilized include any of those which exhibit elastomeric properties. The block copolymers may be diblock, triblock, multiblock, starblock, polyblock or graftblock copolymers. Throughout this specification and claims, the terms diblock, triblock, multiblock, polyblock, and graft or grafted-block with respect to the structural features of block copolymers are to be given their normal meaning as defined in the literature such as in the *Encyclopedia of Polymer Science and Engineering*, Vol. 2, (1985) John Wiley & Sons, Inc., New York, pp. 325–326, and by J. E. McGrath in *Block Copolymers, Science Technology*, Dale J. Meier, Ed., Harwood Academic Publishers, 1979, at pages 1–5.

Such block copolymers may contain various ratios of conjugated dienes to vinyl aromatic hydrocarbons including those containing up to about 40% by weight of vinyl aromatic hydrocarbon. Accordingly, multi-block copolymers may be utilized which are linear or radial symmetric or asymmetric and which have structures represented by the formulae A—B, A—B—A, A—B—A—B, B—A—B, (AB)$_{0,1,2}$ . . . BA, etc., wherein A is a polymer block of a vinyl aromatic hydrocarbon or a conjugated diene/vinyl aromatic hydrocarbon tapered copolymer block, and B is a rubbery polymer block of a conjugated diene.

The block copolymers may be prepared by any of the well-known block polymerization or copolymerization procedures including sequential addition of monomer, incremental addition of monomer, or coupling techniques as illustrated in, for example, U.S. Pat. Nos. 3,251,905; 3,390,207; 3,598,887; and 4,219,627. As well known, tapered copolymer blocks can be incorporated in the multi-block copolymers by copolymerizing a mixture of conjugated diene and vinyl aromatic hydrocarbon monomers utilizing the difference in their copolymerization reactivity rates. Various patents describe the preparation of multi-block copolymers containing tapered copolymer blocks including U.S. Pat. Nos. 3,251,905; 3,639,521; and 4,208,356, the disclosures of which are hereby incorporated by reference.

Conjugated dienes which may be utilized to prepare the polymers and copolymers are those containing from 4 to about 10 carbon atoms and more generally, from 4 to 6 carbon atoms. Examples include from 1,3-butadiene, 2-methyl-1,3-butadiene(isoprene), 2,3-dimethyl-1,3-butadiene, chloroprene, 1,3-pentadiene, 1,3-hexadiene, etc. Mixtures of these conjugated dienes also may be used. The preferred conjugated dienes are isoprene and 1,3-butadiene.

Examples of vinyl aromatic hydrocarbons which may be utilized to prepare the copolymers include styrene and the various substituted styrenes such as o-methylstyrene, p-methylstyrene, p-tert-butylstyrene, 1,3-dimethylstyrene, alpha-methylstyrene, beta-methylstyrene, p-isopropylstyrene, 2,3-dimethylstyrene, o-chlorostyrene, p-chlorostyrene, o-bromostyrene, 2-chloro-4-methylstyrene, etc. The preferred vinyl aromatic hydrocarbon is styrene.

Many of the above-described copolymers of conjugated dienes and vinyl aromatic compounds are commercially available. The number average molecular weight of the block copolymers, prior to hydrogenation, is from about 20,000 to about 500,000, preferably from about 40,000 to about 300,000.

The average molecular weights of the individual blocks within the copolymers may vary within certain limits. In most instances, the vinyl aromatic block will have a number average molecular weight in the order of about 2000 to about 125,000, and preferably between about 4000 and 60,000. The conjugated diene blocks either before or after hydrogenation will have number average molecular weights in the order of about 10,000 to about 450,000 and more preferably from about 35,000 to 150,000.

Also, prior to hydrogenation, the vinyl content of the conjugated diene portion generally is from about 10% to about 80%, and the vinyl content is preferably from about 25% to about 65%, particularly 35% to 55% when it is desired that the modified block copolymer exhibit rubbery elasticity. The vinyl content of the block copolymer can be measured by means of nuclear magnetic resonance.

Specific examples of diblock copolymers include styrene-butadiene (SB), styrene-isoprene (SI), and the hydrogenated derivatives thereof. Examples of triblock polymers include styrene-butadiene-styrene (SBS), styrene-isoprene-styrene (SIS), alpha-methylstyrene-butadiene-alpha-methylstyrene, and alpha-methylstyrene-isoprene alpha-methylstyrene. Examples of commercially available block copolymers useful as the adhesives in the present invention include those available from Shell Chemical Company and listed in the following Table I.

TABLE I

| Kraton | Type | Styrene/Rubber Ratio (w) | Melt Index |
|---|---|---|---|
| D1101 | Linear SBS | 31/69 | <1 |
| D1107P | Linear SIS | 15/85 | 11 |
| D1111 | Linear SIS | 22/78 | 3 |
| D1112P | Linear SIS | 15/85 | 23 |
| D1113P | Linear SIS | 16/84 | 24 |
| D1117P | Linear SIS | 17/83 | 33 |
| D1320X | Multi-arm (SI)$_n$ | 10/90 | NA |

Vector 4111 is a SIS block copolymer available from Dexco of Houston, Tex.

Upon hydrogenation of the SBS copolymers comprising a rubbery segment of a mixture of 1,4 and 1,2 isomers, a styrene-ethylene-butylene styrene (SEBS) block copolymer is obtained. Similarly, hydrogenation of an SIS polymer yields a styrene-ethylene propylene-styrene (SEPS) block copolymer.

The selective hydrogenation of the block copolymers may be carried out by a variety of well known processes including hydrogenation in the presence of such catalysts as Raney nickel, noble metals such as platinum, palladium, etc., and soluble transition metal catalysts. Suitable hydrogenation processes which can be used are those wherein the diene-containing polymer or copolymer is dissolved in an inert hydrocarbon diluent such as cyclohexane and hydrogenated by reaction with hydrogen in the presence of a soluble hydrogenation catalyst. Such procedures are described in U.S. Pat. Nos. 3,113,986 and 4,226,952, the disclosures of which are incorporated herein by reference. Such hydrogenation of the block copolymers which are carried out in a manner and to extent as to produce selectively hydrogenated copolymers having a residual unsaturation content in the polydiene block of from about 0.5% to about 20% of their original unsaturation content prior to hydrogenation.

In one embodiment, the conjugated diene portion of the block copolymer is at least 90% saturated and more often at least 95% saturated while the vinyl aromatic portion is not significantly hydrogenated. Particularly useful hydrogenated block copolymers are hydrogenated products of the block copolymers of styrene—isoprene-styrene such as a styrene-(ethylene/propylene)-styrene block polymer. When a polystyrene-polybutadiene-polystyrene block copolymer is hydrogenated, it is desirable that the 1,2-polybutadiene to 1,4-polybutadiene ratio in the polymer is from about 30:70 to about 70:30. When such a block copolymer is hydrogenated, the resulting product resembles a regular copolymer block of ethylene and 1-butene (EB). As noted above, when the conjugated diene employed as isoprene, the resulting hydrogenated product resembles a regular copolymer block of ethylene and propylene (EP).

A number of selectively hydrogenated block copolymers are available commercially from Shell Chemical Company under the general trade designation "Kraton G." One example is Kraton G1652 which is a hydrogenated SBS triblock comprising about 30% by weight of styrene end blocks and a midblock which is a copolymer of ethylene and 1-butene (EB). A lower molecular weight version of G1652 is available from Shell under the designation Kraton G1650. Kraton G1651 is another SEBS block copolymer which contains about 33% by weight of styrene. Kraton G1657 is an SEBS diblock copolymer which contains about 13%w styrene. This styrene content is lower than the styrene content in Kraton G1650 and Kraton G1652.

In another embodiment, the selectively hydrogenated block copolymer is of the formula $$B_n(AB)_oA_p$$

wherein
n=0 or 1;
o is 1 to 100;
p is 0 or 1;
each B prior to hydrogenation is predominantly a polymerized conjugated diene hydrocarbon block having a number average molecular weight of about 20,000 to about 450,000;
each A is predominantly a polymerized vinyl aromatic hydrocarbon block having a number average molecular weight of from about 2000 to about 115,000; the blocks of A constituting about 5% to about 95% by weight of the copolymer; and the unsaturation of the block B is less than about 10% of the original unsaturation. In other embodiments, the unsaturation of block B is reduced upon hydrogenation to less than 5% of its original value, and the average unsaturation of the hydrogenated block copolymer is reduced to less than 20% of its original value.

The block copolymers may also include functionalized polymers such as may be obtained by reacting an alpha, beta-olefinically unsaturated monocarboxylic or dicarboxylic acid reagent onto selectively hydrogenated block copolymers of vinyl aromatic hydrocarbons and conjugated dienes as described above. The reaction between the carboxylic acid reagent in the graft block copolymer can be effected in solutions or by a melt process in the presence of a free radical initiator.

The preparation of various selectively hydrogenated block copolymers of conjugated dienes and vinyl aromatic hydrocarbons which have been grafted with a carboxylic acid reagent is described in a number of patents including U.S. Pat. Nos. 4,578,429; 4,657,970; and 4,795,782, and the disclosures of these patents relating to grafted selectively hydrogenated block copolymers of conjugated dienes and vinyl aromatic compounds, and the preparation of such compounds are hereby incorporated by reference. U.S. Pat. No. 4,795,782 describes and gives examples of the preparation of the grafted block copolymers by the solution process and the melt process. U.S. Pat. No. 4,578,429 contains an example of grafting of Kraton G1652 (SEBS) polymer with maleic anhydride with 2,5-dimethyl-2,5-di(t-butylperoxy) hexane by a melt reaction in a twin screw extruder. (See Col. 8, lines 40–61.)

Examples of commercially available maleated selectively hydrogenated copolymers of styrene and butadiene include Kraton FG1901X, FG1921X, and FG1924X from Shell, often referred to as maleated selectively hydrogenated SEBS copolymers. FG1901X contains about 1.7%w bound functionality as succinic anhydride and about 28%w of styrene. FG1921X contains about 1%w of bound functionality as succinic anhydride and 29%w of styrene. FG1924X contains about 13% styrene and about 1% bound functionality as succinic anhydride.

Useful block copolymers also are available from Nippon Zeon Co., 2-1, Marunochi, Chiyoda-ku, Tokyo, Japan. For example, Quintac 3530 is available from Nippon Zeon and is believed to be a linear styrene-isoprene-styrene block copolymer.

Unsaturated elastomeric polymers and other polymers and copolymers which are not inherently tacky can be rendered tacky when compounded with an external tackifier. Tackifiers, are generally hydrocarbon resins, wood resins, rosins, rosin derivatives, and the like, which when present in concentrations ranging from about 40% to about 90% by weight of the total adhesive composition, more preferably from about 45% to about 85% by weight, impart pressure-sensitive adhesive characteristics to the elastomeric polymer adhesive formulation. Compositions containing less than about 40% by weight of tackifier additive do not generally show sufficient "quickstick," or initial adhesion, to function as a pressure-sensitive adhesive, and therefore are not inherently tacky. Compositions with too high a concentration of tackifying additive, on the other hand, generally show too little cohesive strength to work properly in most intended use applications of constructions made in accordance with the instant invention.

It is contemplated that any tackifier known by those of skill in the art to be compatible with elastomeric polymer compositions may be used with the present embodiment of the invention. One such tackifier, found useful is Wingtak 10, a synthetic polyterpene resin which is liquid at room temperature, and sold by the Goodyear Tire and Rubber Company of Akron, Ohio. Wingtak 95 is a synthetic tackifier resin also available from Goodyear which comprises predominantly a polymer derived from piperylene and isoprene.

Other suitable tackifying additives may include Escorez 1310, an aliphatic hydrocarbon resin, and Escorez 2596, a $C_5$–$C_9$ (aromatic modified aliphatic) resin, both manufactured by Exxon of Irving, Tex. Of course, as can be appreciated by those of skill in the art, a variety of different tackifying additives may be used to practice the present invention.

In addition to the tackifiers, other additives may be included in the PSAs to impart desired properties. For example, plasticizers may be included, and they are known to decrease the glass transition temperature of an adhesive composition containing elastomeric polymers. An example of a useful plasticizer is Shellflex 371, a naphthenic processing oil available from Shell Oil Company of Houston, Tex. Antioxidants also may be included on the adhesive compositions. Suitable antioxidants include Irgafos 168 and Irganox 565 available from Ciba-Geigy, Hawthorne, N.Y. Cutting agents such as waxes and surfactants also may be included in the adhesives.

The facestock which is utilized in the multilayer PSA label constructions of the present invention may comprise any of a variety of flexible materials known to those skilled in the art to be suitable as a facestock material. For example, the facestock may be composed of such materials as paper (e.g., Kraft, bond, offset, litho and sulfite paper) with or without sizing, or polymeric materials suitable for facestock use such as polyolefins (e.g., polyethylene, polypropylene, ethylene-propylene copolymers, etc.) polyesters, polyamides, etc. In one embodiment, the requirement for the facestock is that it be capable of forming some degree of adhesive bond to one of the adhesive layers. In a preferred embodiment, the facestock comprises a polymeric film which is capable of being printed, and in another embodiment, the polymeric film material should be one which, when combined with the adhesive layers, provides a sufficiently self-supporting construction to facilitate label dispensing (label separation and application). The surface(s) of the facestock material can be corona treated to improve printability and/or adhesion to the adhesive layer in contact therewith. Preferably, the polymeric film material is chosen to provide the construction with one or more of the desired properties such as printability, die-cuttability, matrix-strippability, dispensability, etc.

The polymeric film materials useful as facestocks in the label constructions of the present invention include polystyrenes, polyolefins, polyamides, polyesters, polycarbonates, polyvinyl alcohol, poly(ethylene vinyl alcohol), polyurethanes, polyacrylates, poly(vinyl acetates), ionomers and mixtures thereof. In one embodiment, the polymeric film material is a polyolefin. In another embodiment, the polymeric film material is a blend of a major amount of a polyolefin. Typically, the blends contain greater than 55%, or greater than 70% by weight polyolefin. The polyolefins may be blended with one or more of the polymers listed previously. A preferred blend is the blend of a polyolefin and a poly(vinyl) acetate such as ethylene vinyl acetate. The polyolefin film materials generally are characterized as having a melt index or melt flow rate of less than 30, more often less than 20, and most often less than 10 as determined by ASTM Test Method 1238.

The polyolefins which can be utilized as the polymeric film material (facestock) include polymers and copolymers of ethylene, propylene, 1-butene, etc., or blends of mixtures of such polymers and copolymers. Preferably, the polyolefins comprise polymers and copolymers of ethylene and propylene. In another preferred embodiment, the polyolefins comprise propylene homopolymers, and copolymers such as propylene-ethylene and propylene-1-butene copolymers. Blends of polypropylene and polyethylene with each other, or blends of either or both of them with polypropylene-polyethylene copolymer also are useful. In another embodiment, the polyolefin film materials are those with a very high propylenic content, either polypropylene homopolymer or propylene-ethylene copolymers or blends of polypropylene and polyethylene with low ethylene content, or propylene-1-butene copolymers or blend of polypropylene and poly-1-butene with low butene content.

Various polyethylenes can be utilized as the polymeric film material including low, medium, and high density polyethylenes. An example of a useful low density polyethylene (LDPE) is Rexene 1017 available from Huntsman.

The propylene homopolymers which can be utilized as the polymeric film material in the constructions of the invention, either alone, or in combination with a propylene copolymer as described herein, include a variety of propylene homopolymers such as those having melt flow rates (MFR) from about 0.5 to about 20 as determined by ASTM Test D 1238, condition L. In one embodiment, propylene homopolymers having MFR's of less than 10, and more often from about 4 to about 10 are particularly useful and provide facestocks having improved die-cuttability. Useful propylene homopolymers also may be characterized as having densities in the range of from about 0.88 to about 0.92 g/cm³. A number of useful propylene homopolymers are available commercially from a variety of sources, and some useful polymers include: 5A97, available from Union Carbide and having a melt flow of 12.0 g/10 min and a density of 0.90 g/cm³; DX5E66, also available from Union Carbide and having an MFI of 8.8 g/10 min and a density of 0.90 g/cm³; and WRD5-1057 from Union Carbide having an MFI of 3.9 g/10 min and a density of 0.90 g/cm³. Useful commercial propylene homopolymers are also available from Fina and Montel.

A variety of propylene copolymers are available and useful in preparing facestocks useful in the invention. The propylene copolymers generally comprise copolymers of propylene and up to 10% or even 20% by weight of at least one other alpha olefin such as ethylene, 1-butene, 1-pentene, etc. In one preferred embodiment, the propylene copolymers are propylene-ethylene copolymers with ethylenic contents with from about 0.2% to about 10% by weight. Such copolymers are prepared by techniques well known to those skilled in the art, and these copolymers are available commercially from, for example, Union Carbide. A propylene-ethylene copolymer containing about 3.2% by weight of ethylene is available from Union Carbide under the designation D56D20. Another Union Carbide propylene-ethylene copolymer is D56D8, which contains 5.5% by weight of ethylene.

Particularly useful polyamide resins include resins available from EMS American Grilon Inc., Sumter, S.C. under the general tradename Grivory such as CF6S, CR-9, XE3303 and G-21. Grivory G-21 is an amorphous nylon copolymer having a glass transition temperature of 125° C., a melt flow index (DIN 53735) of 90 ml/10 min and an elongation at break (ASTM D638) of 15. Grivory CF65 is a nylon 6/12 film grade resin having a melting point of 135° C., a melt flow index of 50 ml/10 min, and an elongation at break in excess of 350%. Grilon CR9 is another nylon 6/12 film grade resin having a melting point of 200° C., a melt flow index of 200 ml/10 min, and an elongation at break at 250%. Grilon XE 3303 is a nylon 6.6/6.10 film grade resin having a melting point of 200° C., a melt flow index of 60 ml/10 min, and an elongation at break of 100%. Other useful polyamide resins include those commercially available from, for example, Union Camp of Wayne, N.J. under the Uni-Rez product line, and dimer-based polyamide resins available from Bostik, Emery, Fuller, Henkel (under the Versamid product line). Other suitable polyamides include those produced by condensing dimerized vegetable acids with hexamethylene diamine. Examples of polyamides available from Union Camp include Uni-Rez 2665; Uni-Rez 2620; Uni-Rez 2623; and Uni-Rez 2695. Some of the physical properties of polymer films formed from the Uni-Rez polyamides are summarized in the following

TABLE II

| Uni-Rez Product | Softening Point (° C.) | Brookfield Viscosity (cPs at 190° C.) | Tensile Strength (PSE) | Percent Ultimate Elongation |
|---|---|---|---|---|
| 2620 | 105 | 900 | 1000 | 50 |
| 2623 | 106 | 6500 | 1000 | 400 |
| 2665 | 165 | 11,000 | 2000 | 500 |
| 2695 | 128 | 5000 | 200 | 175 |
| 2620/2623 (blend at 1:3) | 128 | 5100 | 1000 | 313 |

Polystyrenes can also be utilized as the polymeric film material of the facestock in the constructions of the invention and these include homopolymers as well as copolymers of styrene and substituted styrene such as alpha-methyl styrene. Examples of styrene copolymers and terpolymers include: acrylonitrile-butene-styrene (ABS); styrene-acrylonitrile copolymers (SAN); styrene butadiene (SB); styrene-maleic anhydride (SMA); and styrene-methyl methacrylate (SMMA); etc. An example of a useful styrene copolymer is KR-10 from Phillips Petroleum Co. KR-10 is believed to be a copolymer of styrene with 1,3-butadiene.

Polyurethanes also can be utilized as the polymeric film material of the facestock and the polyurethanes may include aliphatic as well as aromatic polyurethanes.

Polyesters prepared from various glycols or polyols and one or more aliphatic or aromatic carboxylic acids also are useful film materials. Polyethylene terephthalate (PET) and PETG (PET modified with cyclohexanedimethanol) are useful film forming materials which are available from a variety of commercial sources including Eastman. For example, Kodar 6763 is a PETG available from Eastman Chemical. Another useful polyester from duPont is Selar PT-8307 which is polyethylene terephthalate.

Acrylate polymers and copolymers and alkylene vinyl acetate resins (e.g., EVA polymers) also are useful as the film forming materials in the preparation of the facestocks in the constructions of the invention. Commercial examples of available polymers include Escorene UL-7520 (Exxon), a copolymer of ethylene with 19.3% vinyl acetate; Nucrell 699 (duPont), an ethylene copolymer containing 11% of methacrylic acid; etc.

Ionomers (polyolefins containing ionic bonding of molecular chains) also are useful. Examples of ionomers include ionomeric ethylene copolymers such as Surlyn 1706 (duPont) which is believed to contain interchain ionic bonds based on a zinc salt of ethylene methacrylic acid copolymer. Surlyn 1702 from duPont also is a useful ionomer.

Polycarbonates also are useful, and these are available from the Dow Chemical Co. (Calibre) G.E. Plastics (Lexan) and Bayer (Makrolon). Most commercial polycarbonates are obtained by the reaction of bisphenol A and carbonyl chloride in an interfacial process. Molecular weights of the typical commercial polycarbonates vary from about 22,000 to about 35,000, and the melt flow rates generally are in the range of from 4 to 22 g/10 min.

The polymeric film material is chosen to provide a facestock with one or more of the desired properties such as improved printability, weatherability, strength, water resistance, abrasion resistance, gloss, die-cuttability, and matrix strippability. It is particularly desirable that the surface of the facestock can be printed or adapted to be printed with inks using printing techniques such as flexographic printing, screen printing, offset lithography, letter press, thermal transfer, etc., and that the applied ink has acceptable adhesion to the surface of the film of the adhesive construction. The choice of polymeric film forming material also is determined by its physical properties such as melt viscosity, high speed tensile strength, percent elongation etc.

The thickness of the facestocks may range from about 0.1 mil (2.5 microns) to about 1.5 mils (37 microns) or even 2.0 mils (50 microns). More often the thicknesses of the films are from about 0.2 mils (0.5 microns) to about 1.0 mil (25 microns). A thickness of about 0.5 mils (about 12 microns) is particularly useful.

Figure 4:
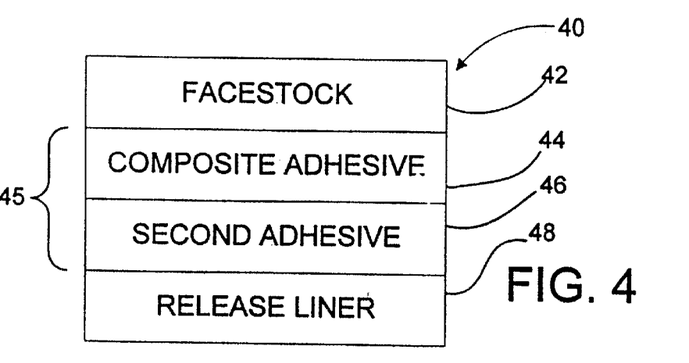
FIG. 4 is a schematic illustration of a side view of another label construction of the present invention containing a release liner.

Another embodiment of the multilayer PSA composite constructions of the present invention is illustrated in FIG. 4. In this embodiment, the label construction 40 comprises a construction as illustrated in FIG. 2 with the addition of a release liner 48. More particularly, the construction 40 comprises: a facestock 42 having an upper surface and a lower surface; a composite adhesive layer 44 having an upper and lower surface wherein the upper surface is in contact and adhered to the lower surface of the facestock 42 (thus adhesive layer 44 is also referred to as a FSG); a second adhesive layer 46 (surface layer) having an upper and a lower surface wherein the upper surface of the second adhesive layer 46 is in contact with a lower surface of the composite adhesive layer 44; and a release liner 48 having an upper and lower surface wherein the upper surface of the release liner 48 is in contact with the lower surface of the second adhesive layer 46. Thus, the second adhesive layer in this embodiment is an LSA (liner side adhesive). The combination of the composite adhesive layer 44 and the second adhesive layer 46 comprises the multilayer adhesive laminate 45 of this embodiment. Other composite constructions of the present invention containing a release liner can be illustrated by adding a release liner to FIGS. 1–3. In FIG. 1, the upper surface of a release liner would be in contact with the lower surface of the composite adhesive 16, and, in FIGS. 2 and 3, the upper surface of a release liner would be in contact with the lower surface of the second adhesive layers 26 and 38, respectively.

The release liners which may be utilized in the label construction of the present invention may consist of any of a variety of materials known to those of skill in the art to be suitable as release liners. In one preferred embodiment, the release liner comprises a silicone coated paper substance.

The multilayer adhesive laminates comprising at least one composite PSA adhesive layer and at least one second PSA layer, and the adhesive label constructions of the present invention may be prepared by any means known to those skilled in the art. For example, the composite adhesive layer and the second adhesive layer may be applied by solvent coating, hot melt coating, or emulsion coating at one or more coating stations onto a facestock or a release liner. Other known methods of forming the adhesive layers include dry lamination, using proximity coating methods such as die or roll coating, or non-contact coating methods such as curtain coating, slide coating, multilayer die-coating, or die/slide combination coating. The two adhesive layers may also be coated to different substrates which can then be laminated together to form the label construction. For example, the composite adhesive layer may be coated to the backside of a facestock, and the second adhesive layer may be coated on a release liner. These coated materials may then be brought together, adhesive to adhesive, to form the desired label construction.

In one embodiment of the invention, the adhesive layers are simultaneously coated on the liner or the facestock using non-contact coating methods such as curtain, slide or spray coating or proximity coating methods such as taught in U.S. Pat. No. 5,728,430 to Luigi et al, where a pressure-gradient regulated dual-slot die is used to coextrude both adhesive layers on the release liner, and the layers are eventually dried and laminated to the facestock. In another technique for a sequential coating, one adhesive layer is applied first on the liner, then another adhesive layer is applied on top of the previous layer using a non-contact coating method such as spray, curtain or slide coating. These coating techniques may be combined to produce a multilayer adhesive construction. For example, a single layer of adhesive may be coated on the facestock, and two layers of adhesive may be simultaneously coated on the release liner. A three-layer adhesive construction is obtained by laminating the adhesive layers together after drying.

Figure 5:
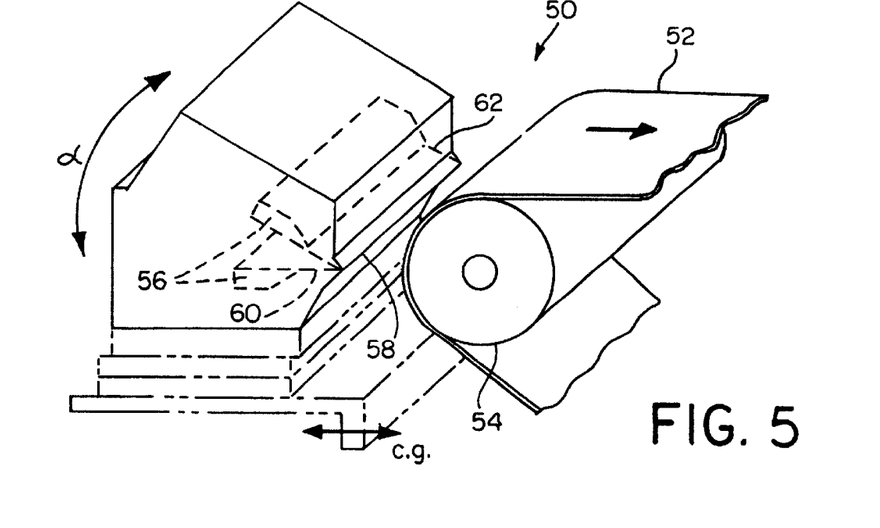
FIG. 5 is a schematic diagram of a dual die useful in applying the adhesive layers.

One preferred method of manufacture uses a multilayer die 50 such as that illustrated in FIG. 5. Although the die shown in FIG. 5 illustrates the application of two coating layers to a substrate 52, it will be understood that the principles of this method are equally applicable to more than two layers. In accordance with standard practice, the substrate, which in this case may be a facestock or a release liner, is referred to as a "web" and is formed into a long roll. The web 52 travels around a back-up roll 54 as it passes the distal end of the multilayer die 50. As shown in FIG. 5, both the die 50 and the web 52 have substantially equal width such that the entire width of the web is coated in one pass by the fluid flowing out of the die 50 and onto the web 52. In this case, two separate fluid layers are flowing out of manifolds 56 formed in the die 50 and along individual slots 60, which are defined by the die's distal ends 62. The slots 60 each communicate with the interface between the web 52 and the distal most tips 58 of the die 50. These tips are referred to as the "die lips" 58 and are illustrated and described in more detail in connection with FIG. 6 below.

Figure 7:
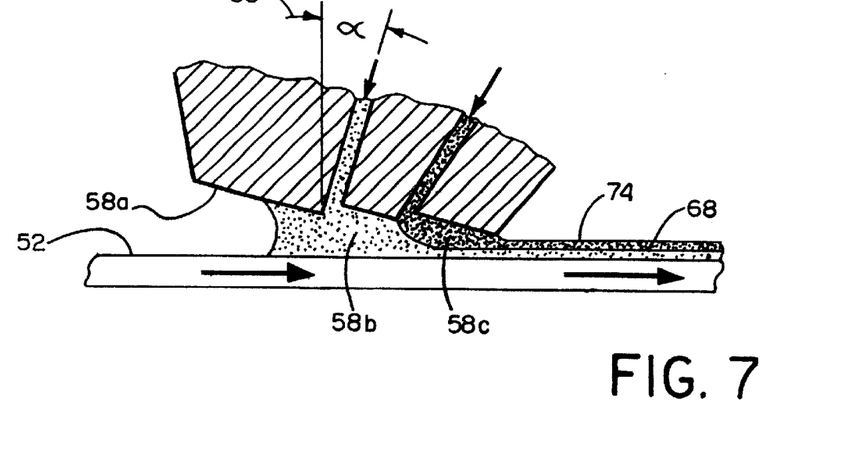
FIG. 7 is a cross-sectional view showing an angled lip structure of the dual die as it is applying two layers of adhesive.

The multilayer die 50 is modular, thus allowing for variations in the individual slots 60 and lip 58 configurations without necessitating modifications to the other slots and lips. Thus, these geometries can be adjusted in order to achieve successful coating. Other variables include the "coating gap" (c.g.) and the "angle of attack" (α) of the die. As illustrated in FIG. 5, the coating gap is the distance that the lips 58 are set back from the web. The angle of attack (α) is the degree of angular adjustment of the lip surfaces and of the entire die with respect to the outer pointing normal of the web as illustrated in FIG. 7. Another variable is the web speed, which preferably varies between 50 and 1,000 feet per minute, or more.

Either one of two die coating methods may be utilized: interference coating or proximity coating. In the former case, the lips 58 of the die actually are pressed forward in the direction of the web 52, but do not contact the web nor cause any damage thereto, because they hydroplane on a thin layer of coating material. However the pressure may actually cause the back-up roll 54 (typically constructed from a hard rubber material) to deform in order to relieve the pressure of the die against the lips 58. In proximity coating, the lips 58 of the die 50 are positioned a precise distance from the web 52 and are not pressed forward toward the web. The back-up roll 54 is typically constructed from a stainless steel that allows for precision in the circumference of the roll and minimizes roll run-out. The method described herein can be successfully utilized with either type of coating technique.

Figure 6:
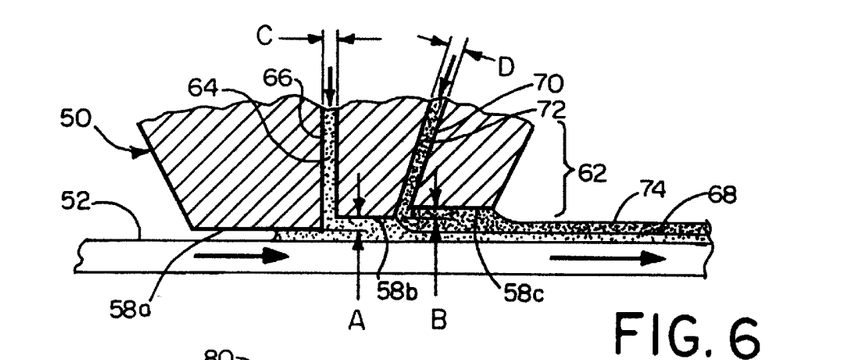
FIG. 6 is a cross-sectional view showing the lip structure of the dual die of FIG. 5 as it is applying two layers of adhesive.

Because very thin layers of high viscosity adhesives are being coated at relatively high web speeds, the process must be carefully controlled. Such control is accomplished with the present multilayer die coating technique, in part due to the geometry and configuration of the die lips 58. FIG. 6 shows a close-up view of the distal most tips 62 of the multilayer die of FIG. 5, including the lips 58 associated with each slot 60, showing the interface or coating gap with respect to the web 52. With respect to FIG. 6, it should be noted that, for ease of illustration, the die 50 is shown rotated 90° from the position shown in FIG. 5. Moreover, the web 52 is shown in a horizontal arrangement, when in actuality, there may be a slight curvature to the web 52 and back-up roll (not shown) at this point; however, the distances involved are so short that a good approximation of the fluid dynamics can be achieved by assuming a horizontal web 52.

For consistent reference, the individual lips 58 of the multilayer die 50 shall be referred to with respect to the direction of travel of the web 52. For example, the lip 58a shown to the left in FIG. 6 will be referred to as the "upstream lip", while the right-most lip 58c shall be referred to as the "downstream lip". Thus, the "middle lip" 58b will have that same reference. Accordingly, the upstream and middle lips 58a, 58b define an upstream feed gap 64 through which an adhesive material 66 flows onto the web 52 to form a bottom adhesive layer 68 of a multilayer adhesive product. Likewise, the middle lip 58b and the downstream lip 58c together form a slotted feed gap 70 through which adhesive 72 flows onto the top of the lower layer 68 as the web travels in left-to-right direction, as illustrated in FIG. 6. This forms a top adhesive layer 74 of the multilayer adhesive product. Again, for ease of illustration, the top layer 74 is shown as a darker-colored material, but this may not necessarily be the case in actual production. For instance, various colors or tags such as ultra-violet fluorescent dye may be utilized to facilitate measurement of individual layer thicknesses.

Coating of viscous adhesives at these web speed rates can involve a number of problems. For example, recirculations in the flow of either the bottom or top adhesive layers can result in certain defects in the final multilayer product. Such recirculations may occur if the separation point of either liquid adhesive with respect to the die lips 58 occurs at an inappropriate location. In addition, an extreme pressure gradient can result in the upstream leakage of liquid out of the coating gap area, again causing defects in the end product due to nonuniform adhesive layer thicknesses, etc. Moreover, these and other defects result in the diffusion of one layer in the other since the layers are being coated simultaneously in the liquid state. Such diffusing jeopardized the integrity and performance of the resulting product.

Thus, it has been found, with respect to the multilayer die coating described herein, that it is very important to control the pressure gradients of the adhesives under each lip. In particular, the top layer should separate from the middle lip at the downstream corner of the lip. In order to achieve such coating control, the lips 58 of each die section are stepped or spaced away from the web 52 in the downstream direction. This design allows the lips to generate the appropriate pressure gradients and to ensure smooth flow of the adhesive and uniform layer thicknesses. The adjustment of a number of run parameters are necessary in order to achieve this goal.

For example, the coating gaps at lip 58*b* and 58*c* should be approximately in the range of one to three times the compounded wet film thicknesses of the layers being fed from upstream of said lip. Under the upstream lip 58*a*, the new flow rate is necessarily zero, and a turn-around flow is the only possibility. Thus, the coating gap under this lip is solely set in order to avoid leakage of the liquid out from the coating gap in the upstream direction. Moreover, the upstream step, defined as dimension A in FIG. 6, and the downstream step, defined as dimension B, may range anywhere from zero to four mils (0.0 inches to 0.004 inches/0 to 100 μm). The feed gaps (defined as dimensions C and D in FIG. 6) can also be adjusted anywhere between one and fifteen mils (0.001 inches to 0.015 inches/25 μm to 325 μm), preferably not to exceed five times the wet film thickness of their correspondent layers. In addition, the length of the lips 58 in the direction of web travel play an important role in achieving the proper pressure gradient. Thus, the upstream lip 58*a* should be approximately two millimeters in length, or more, as necessary to seal the head as noted above. The downstream lip 58*c* and middle lip 58*b* may fall within the range of 0.1 to 3 mm in length.

It will be recognized that one of ordinary skill in the art can adjust these various parameters in order to achieve the proper fluid dynamics for uniform layer coating. Of course, persons of more than ordinary skill can adjust the die and run parameters more precisely in order to achieve good results. However, such persons are not always readily available in production settings. Therefore, it is advantageous to provide a die geometry that will increase the size of the window of successful multilayer coating operation. This can be achieved by certain adjustment sin the orientation of the die lips.

Thus, FIG. 7 illustrates the die 50 of FIG. 6 rotated slightly in the clockwise direction representing an "angle of attack" (α). For consistent reference, the angle of attack (α) shown in FIG. 7 represents a negative angle of attack, or a "converging" orientation of the downstream lip 58*c* with respect to the web 52. This converging lip orientation provides a negative pressure gradient (in the direction of web travel), along the downstream lip 58*c*, which is beneficial in preventing a coating defect well known as "ribbing", a pattern of regular striation in the sense of the web travel in the film. The fact that the middle and the upstream lips 58*a* and 58*c* also achieve a convergent orientation is not particularly beneficial. Although the angle of attack of the die can be varied widely in order to achieve these advantages, it has been found that angles in the rate of 0° to –5° are appropriate.

Figure 8:
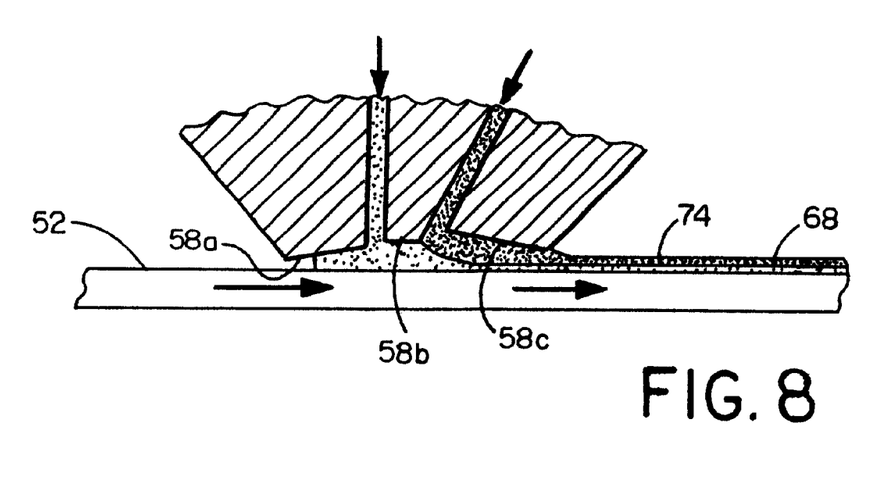
FIG. 8 is a cross-sectional schematic view of a dual die featuring a beveled lip structure.

An even further successful operating window can be achieved with additional lip modifications. FIG. 8 shows a variation of the lip configuration of FIG. 7. In this configuration, the downstream lip 58*c* is angled or beveled to as to have a converging profile, similar to that shown in FIG. 7. However, the middle lip 58*b* is positioned so as to be flat or parallel with respect to the web 52. The upstream lip 58*a*, on the other hand, is beveled so that it is diverging from the web 52 in the downstream direction. This configuration, again, provides the appropriate pressure gradient under the individual lips to avoid recirculations and upstream leakage. Moreover, if perturbations in the coating conditions occur (such as, for example, due to roll run-out, foreign objects on the web, variations in ambient pressure, etc.), the converging configuration of the upstream lip 58*a* shown in FIG. 8 will product a dampening effect on flow conditions so that defects in the coating layers do not occur. In this manner, the multilayer coating bead acts as a non-linear spring to dampen out such unwanted events in order to return to steady state. The die 50 can then be adjusted in accordance with standard angle of attack variations to achieve favorable coating conditions. Because the lips 58 are pre-disposed or beveled in a favorable orientation, the adjustment of angle of attack, as well as coating gap, need not be so precise. Thus, persons of ordinary skill or even less skill can successfully achieve good coating results.

The following coating Examples, P-1 to P-3, illustrate different procedures that may be used to form the multilayer adhesive laminates useful in the preparation of the label constructions of the invention.

EXAMPLE P-1

In order to coat a single layer of the adhesive or a composite of the adhesive and an inorganic filler as described above, a coating substrate (a release liner) is pulled under tension through a pre-determined gap between a stainless steel doctoring blade which is 6 inches long and 0.25 inch thick, and a smooth stainless steel backup roll of 1 inch in diameter. A sufficient amount of adhesive is carefully poured onto the release liner before entering the gap. The doctor blade with sharp straight coating edges (less than 0.5 mil in curvature radius) then removes excessive amounts of adhesive from the release liner to yield a uniform adhesive coating with coating weights determined by the gap setting. Immediately after the coating, a section of the coated substrate is placed in a circulated thermal oven at 105° C. for 5 minutes.

A method of transfer coating by lamination is used to laminate the adhesive between the release liner and the facestock to transfer the adhesive from the release liner to the facestock. The facestock/adhesive/release liner laminate is then sent through a laminator made by General Binding Corporation, model number 425LM-1, to ensure proper adhesive bonding to the facestock. The laminate is die-cut into test samples of specific shapes for subsequent performance testing. The samples from the same coating run are randomized to achieve the best statistical results.

EXAMPLE P-2

Dual-layer adhesives are constructed by being simultaneously coated (coextruded) on the release liner using a six-inch wide dual-slotted die as disclosed in U.S. Pat. No. 5,728,430 (Luigi et al). The adhesives of both layers are delivered to the upper and lower chambers of the dual die by positive displacement gear pumps made by Zenith Division of Parker Hannifin Corporation (model number BMC 5337-11.1-2001) with a 1.4 inch pinion gear driven by a DC drive of CAT-LISTING SR3640-8293-84-7-56HC, controlled by ZeDrive controller of (model number 6150799-001). The movement of the web, which is a release liner is controlled by a servo motor with a web encoder for the feedback control of the line speed. When it is time to coat, an air cylinder brings the die on an air slide to a 6-inch diameter by 12-inch wide backup roll where the web is tensioned over with a wrap of about 140°. The backup roll is covered by a layer of 65–75 Durometer rubber (urethane) of 0.5 inch thick with a small tolerance of diameter error less than 1 mil. The gap between the die lips and the backup roll surface is adjusted using a micrometer table (DAEDAL 6" square ball slide stage with a 1" travel sold by Minarik) and therefore controls the adhesive coat weight. After a section of adhesive coating is applied to the web, the line is stopped, and a section of the coated material is cut and placed into a thermal oven. The adhesive is then dried and test samples are prepared as described above.

(As an alternative method of coating single layer adhesive, the dual-die can also be used to produce single layer adhesive coatings by simply shutting off one adhesive feed and coating only the other adhesive layer. The minimum coat weight can be as low as 2 g/m$^2$.)

EXAMPLE P-3

The multilayer adhesive constructions also can be made using the method of transfer-coating by lamination where single- or dual-layer dried adhesive which is initially deposited on the release liner such as described above is transferred to the facestock by laminating the adhesive between the release liner and the facestock. The laminate is then sent through a laminator made by General Binding Corporation (model number 425LM-1) to ensure proper adhesive bonding to the facestock. After the release liner is removed and the adhesive is exposed, a second layer of adhesive can be transferred on top of the first adhesive layer to form a dual-layer adhesive structure. In the instances where the first or second adhesive layer is actually a dual-layer adhesive as described above, the resulting multilayer adhesive will be a triple-layer construction. More layers of adhesives can be subsequently transferred to make multilayered structures having four or more layers of adhesive.

In the following Examples 1–9, which are non-limiting examples of various embodiments of the present invention, and in Control Examples C-1 to C-5, the facestock is 60 pound Kromekote Litho paper made by Champion International Corporation, and the release liner is 3.2 mil Rhi Lease supplied by Wausau Papers with a 0.65 pound silicone coating to ensure low adhesion properties. The adhesive used in Examples 1–9 is described as follows.

Adhesive A

This adhesive is a blend of emulsion polymer particles with dispersion tackifier particles as generally described in Example 2 of U.S. patent application Ser. No. 08/905,073 filed Jul. 31, 1997. The polymer is made by emulsion polymerization of 2-ethylhexyl acrylate, vinyl acetate, dioctyl maleate, acrylic and methacrylic acid comonomers as described in U.S. Pat. No. 5,164,444 by M. Bernard, resulting in the latex particle size of about 0.2 microns in weight average diameter, and a gel content of about 60%. The tackifier dispersion, Akzo Nobel's Snowtack 920G, is an emulsified aqueous dispersion of rosin ester having a weight average particle diameter of about 0.55 microns. The adhesive has about 58% of solids, a pH value of 7.5 in emulsion form, and a Tg of −4° C. in the dry form.

When the inorganic filler is in colloidal form such as colloidal silica, the filler can be readily blended in the adhesive using a blade mixer rotating at 600 rpm for one hour. If the filler is a dry powder, a paste of 70% filler is first prepared by slowly charging distilled water into the filler in a container, and the filler and water are mixed with a blade mixer rotating at 10 rpm for 30 minutes. The adhesive is then slowly charged to the paste until a predetermined quantity of filler is reached in the blend. The mixing speed is then increased to 600 rpm for one hour. This blend can optionally be degassed under vacuum of about 10$^{-2}$ torr for one hour to purge out entrapped air bubbles in the blend for a better coating quality.

EXAMPLES 1–9 AND C-1 TO C-5

Several composite adhesive constructions are prepared using a variety of fillers as identified in the following Table III. The constructions are produced utilizing the facestock and release liner described above with the coating methods as described in coating methods Examples P-1 to P-3 as indicated in the last column of Table III. Example C-1 includes a single layer of adhesive with no filler whereas Example C-2 to C-5 include a single layer filled with 50 phr of CaCO$_3$, 25 phr of ZnO, 7 phr of SiO$_2$, and 100 phr of styrene-butadiene latex respectively.

TABLE III

Multilayer Label Constructions and Control Samples

| Example | Composite Layer[a] Filler | Loading (phr[c]) | Coat Weights[b] g/m$^2$ | Coating Method (Example) |
|---|---|---|---|---|
| Control-1 | — | — | 20/-/- | P-1 |
| Control-2 | CaCO$_3$[d] | 50 | -/31/- | P-2 |
| 1 | CaCO$_3$[d] | 50 | 5/22/- | P-3 |
| 2 | CaCO$_3$[d] | 100 | -/22/4 | P-3 |
| 3 | CaCO$_3$[d] | 100 | 4/22/- | P-2 |
| 4 | CaCO$_3$[d] | 100 | 4/22/4 | P-3 |
| 5 | TiO$_2$[e] | 25 | -/20/10 | P-3 |
| 6 | TiO$_2$[e] | 25 | 10/20/- | P-3 |
| Control 3 | ZnO[f] | 25 | -/23/- | P-3 |
| 7 | ZnO[f] | 25 | 9/15/- | P-3 |
| Control 4 | SiO$_2$[g] | 7 | -/24/- | P-1 |
| Control 5 | SBL[h] | 100 | -/21/- | P-1 |
| 8 | SBL[h] | 100 | 8/13/- | P-3 |
| 9 | SBL[h] | 100 | 8/13/8 | P-3 |

[a]Composite Layer is a layer of filled adhesive except for Control-1.
[b]Dry coat weights of multiple adhesive layers are in the order of LSA/composite-layer/FSA, where the LSA is a layer of unfilled adhesive on the release liner side of the multilayer adhesive construction. The coat weight of the Composite layer includes both the adhesive and the filler. The FSA is a layer of unfilled adhesive on the facestock side of the multilayer adhesive construction. A "-" indicates that the corresponding layer is not present.
[c]phr is part of filler per hundred part resin (e.g., 100 phr filler loading indicates a 50:50 filler-to-adhesive ratio in dry weights).
[d]Calcium carbonate (CaCO$_3$) from Fisher Scientific, Cat. No. C117–500.
[e]Titanium dioxide (TiO$_2$) from Fisher Scientific, Cat. No. T315–500.
[f]Zinc oxide (ZnO) from Fisher Scientific, Cat. No. Z50–500.
[g]Colloidal silica (SiO$_2$) from Aldrich, Cat. No. 42,155–3.
[h]Styrene-butadiene latex (styrofan ND 593 from BASF Corp.)

Additional representative examples of adhesive compositions useful in practicing the present invention are set forth in the following Table IV. All values listed are in parts by weight. Adhesives B and C contain inorganic filler (calcium carbonate) whereas adhesive D contains no filler particles.

TABLE IV

Adhesive Formulations (pbw)

| | B | C | D |
|---|---|---|---|
| Kraton 1107P | 16.5 | 13 | 23.5 |
| Solprene 1205 | 8.5 | 17 | 11.5 |
| Escorez 2596 | 55 | 58 | 37 |
| Wingtack 10 | 10 | 0 | 14 |
| Shellflex 371 | 10 | 12 | 14 |
| Camel Wite (CaCO$_3$) | 8.5 | 12 | 0 |
| Irgafos 168 | 0.6 | 0.6 | 0.6 |
| Irganox 565 | 0.3 | 0.3 | 0.3 |
| Total | 109.4 | 112.9 | 100.9 |

Set forth in Table V are Examples 10–14 which illustrate additional examples of multilayer pressure-sensitive adhesive constructions in accordance with the present invention. These examples utilize the hot melt adhesive formulations described in Table IV, and the two layers are applied to the liner sequentially. These examples illustrate a variety of useful coat weight ranges for individual layers in exemplary embodiments of the present invention. The examples also illustrate the multilayer PSA constructions of the invention wherein the composite adhesive layer and the second adhesive layer are aligned differently between the facestock and a release liner. As used in Table V, "FSA" refers to the face side adhesive or the adhesive layer nearest the facestock, and "LSA" refers to the liner side adhesive or the adhesive layer nearest the release liner. The two layers of adhesive are deposited using the dual die technique described above as Example P-2 and the two layers are simultaneously coated (coextruded) on the release liner. The coating weight for each layer is 9 gms/m$^2$. The examples of the multilayer pressure-sensitive adhesive constructions prepared utilizing these adhesives in accordance with the present invention are illustrated in the following Table VI.

TABLE V

| Example | Facestock | FSA | FSA Coat Weight (g/m$^2$) | FSA Feed Temp (° C.) | LSA | LSA Coat Weight (g/m$^2$) | LSA Feed Temp (° C.) | Release Layer |
|---|---|---|---|---|---|---|---|---|
| 10 | HG | B | 10 | 160 | C | 10 | 160 | SP |
| 11 | HG | A | 8 | 150 | C | 12 | 170 | SP |
| 12 | HG | B | 12 | 160 | C | 8 | 160 | SP |
| 13 | HG | B | 8 | 160 | C | 12 | 160 | SP |
| 14 | HG | B | 8 | 150 | C | 12 | 170 | SP |

HG-60 lb high gloss paper
SP-silicone coated 40 lb SCK

Additional representative examples of adhesive compositions (Examples E–I) useful in practicing the present invention are prepared by adding corn starch or styrene-acrylic microspheres in different amounts to a tackified emulsion acrylic PSA polymer of the type described in U.S. Pat. No. 5,221,706. In particular, the acrylic adhesive formulation E contains no filler whereas adhesive formulations F–I contain additives as follows:

| | |
|---|---|
| Adhesive E | No filler |
| Adhesive F | 5% corn starch - Durabond A |
| Adhesive G | 10% corn starch - Durabond A |
| Adhesive H | 5% styrene - acrylic copolymer microspheres (Ropaque, 0.5 micron) |
| Adhesive I | 5% Ropaque, 1.0 micron |

Several composite adhesive constructions are prepared using the above adhesive formulations. The constructions are produced utilizing a facestock which is 50 lb. uncoated, wood-free, sized two side label stock, and the release liner is a silicone-coated 42 lb. supercalendared Kraft release liner.

TABLE VI

| | Label Constructions | |
|---|---|---|
| Example | FSA | LSA |
| 15 | E | F |
| 16 | E | G |
| 17 | F | E |
| 18 | G | E |
| 19 | G | F |
| 20 | E | H |
| 21 | E | I |

Yet additional representative examples of adhesive compositions (Examples J–S) useful in practicing the present invention are set forth in the following Table VII.

TABLE VII

| | Adhesive Formulations (pbw) | | | | | | | | | |
|---|---|---|---|---|---|---|---|---|---|---|
| | J | K | L | M | N | O | P | Q | R | S |
| Kraton 1107P | 0.00 | 0.00 | 0.00 | 0.00 | 0.00 | 0.00 | 0.00 | 0.00 | 0.00 | 19.10 |
| KX 604[1] | 0.00 | 8.00 | 8.00 | 15.40 | 15.40 | 15.40 | 15.40 | 15.40 | 15.40 | 0.00 |
| Kraton 1113P | 13.00 | 0.00 | 0.00 | 0.00 | 0.00 | 0.00 | 0.00 | 0.00 | 0.00 | 0.00 |
| Solprene 1205 | 17.00 | 22.00 | 22.00 | 20.10 | 20.10 | 20.10 | 20.10 | 20.10 | 20.10 | 16.40 |
| Hercotac 2010[2] | 0.00 | 58.00 | 58.00 | 52.70 | 52.70 | 52.70 | 52.70 | 52.70 | 52.70 | 55.50 |
| ECR 185[3] | 58.00 | 0.00 | 0.00 | 0.00 | 0.00 | 0.00 | 0.00 | 0.00 | 0.00 | 0.00 |
| Escorez 2596 | 12.00 | 12.00 | 12.00 | 11.80 | 11.80 | 11.80 | 11.80 | 11.80 | 11.80 | 9.00 |
| Camel Wite | 12.00 | 0.00 | 10.00 | 0.00 | 0.00 | 10.00 | 0.00 | 5.00 | 5.00 | 0.00 |
| Pluronic F-108[4] | 0.00 | 0.00 | 2.00 | 0.00 | 2.00 | 0.00 | 2.00 | 0.00 | 2.00 | 0.00 |
| Carbowax 1450[5] | 0.00 | 0.00 | 3.00 | 0.00 | 3.00 | 0.00 | 3.00 | 0.00 | 3.00 | 0.00 |
| Leucopure EGM[6] | 0.02 | 0.02 | 0.02 | 0.02 | 0.02 | 0.02 | 0.02 | 0.02 | 0.02 | 0.00 |
| Irgafos 168 | 0.60 | 0.60 | 0.60 | 0.60 | 0.60 | 0.60 | 0.60 | 0.60 | 0.60 | 0.60 |
| Irganox 565 | 0.30 | 0.30 | 0.30 | 0.30 | 0.30 | 0.30 | 0.30 | 0.30 | 0.30 | 0.30 |
| Total | 112.92 | 100.92 | 115.92 | 100.92 | 105.92 | 110.92 | 115.92 | 105.92 | 110.92 | 100.90 |
| Tg (Calculated) | −16.9 | −14.4 | −14.4 | −17.8 | −17.8 | −17.8 | −17.8 | −17.8 | −17.8 | −17.8 |

[1]An SIS rubber from Shell
[2]A hydrocarbon tackifier resin from Hercules
[3]A hydrocarbon tackifier resin from Exxon
[4]Block copolymer of propylene oxide and ethylene oxide-nonionic surfactant
[5]A polyethylene glycol wax from Union Carbide
[6]A UV fluorescent dye Set forth in Table VIII are Examples 22–30 which illustrate additional examples of multilayer pressure-sensitive adhesive constructions in accordance with the present invention. The constructions are produced utilizing a facestock which is a 40 lb. high gloss paper, and a release liner which is a silicone coated 40 lb. supercalendared kraft release liner. The two layers of adhesive are deposited on the release liner using a dual-die technique described above as Example P-2, and the two layers are simultaneously coated (coextruded) onto the release liner. The coating weight for each layer is 10 gms/m$^2$.

TABLE VIII

| | Adhesive Constructions | |
|---|---|---|
| Example | FSA | LSA |
| 22 | J | S |
| 23 | K | S |
| 24 | L | S |
| 25 | M | S |
| 26 | N | S |
| 27 | O | S |
| 28 | P | S |
| 29 | Q | S |
| 30 | R | S |

As mentioned and illustrated above, the composite constructions of the present invention may be combined with a release liner by contacting a release liner with the surface adhesive layer to form label stock. The label construction of the invention may be converted to labels by procedures well known to those skilled in the art. Thus, the label stock may be printed and die-cut into individual labels. The printing step may occur before or after the combining of the adhesive constructions of the invention and the release liner, but will precede the die-cutting of the facestock into individuals labels. The film must remain in accurate register between printing steps (for example, between successive impressions and different colors) in order that image or text may be of high quality, and between printing and subsequent die-cutting in order that the image or text be located properly on the labels. The film is under tension during printing, and may be subjected to some increase in temperature, such as, for example, when UV inks are cured, and the film must maintain dimensional stability in the machine-direction.

The label stock is die-cut into a series of spaced pressure-sensitive labels carried by the release liner. This step may be performed by rotary cutting dies in a well known manner and involves a subsequent stripping of the ladder-shaped matrix of waste or trim materials surrounding the formed labels when they are die-cut (the "rungs" of the ladder representing the spacing between successive labels). The labels then remain on the liner in spaced relation with each other. One failure mode in this operation involves poorly die-cut labels remaining with the matrix as it is stripped. In this mode, as the release levels decrease, poor die-cutting is more likely to cause labels to stay attached to the liner during matrix material and be removed from the liner during matrix stripping along with the matrix. Another failure mode results when the films being die-cut are of insufficient strength. As the strength of the matrix material decreases, the matrix tends to tear as the matrix around the die-cut labels is pulled from the liner. The films of the present invention do have sufficient strength to avoid or reduce breakage of the matrix upstripping.

In one embodiment the composite label constructions of the present invention advantageously have sufficient stiffness to be dispensable utilizing commercially available dispensable apparatus such as a peel-back edge. In a preferred embodiment of the present invention, the composite constructions are peel-plate dispensable. Dispensability, as defined earlier, includes the steps of the separation of the labels from the liner, and the successful application of the label to an application substrate surface.

The following tests are used to evaluate the performance of the PSA labels of the present invention:

Peel Adhesion 90°

Under standard controlled conditions ((50% RH and 25° C.), a label sample is die-cut into a 1-in×8-in strip and applied to a test substrate. The strip is rolled down 5 times back and forth using a 4.5 lb (2-Kg) rubber-faced roller. With the use of an Instron (or equivalent mechanical test machine such as Sintech 500 by MTS), the label is removed after 10 minutes, at a speed of 12 inches per minute and an angle of 90° (i.e., perpendicular to the test substrate). The average force required to remove the label is measured and considered the Peel Adhesion in a unit of pound per linear inch (pli). The test measures the overall bonding strength of the adhesive.

Loop Tack

Under standard controlled conditions ((50% RH and 25° C.), a label sample is cut into a 1-in×8-in strip with both ends folded back by ½ in. The strip is then formed into a loop with the adhesive on the outside by holding the ends together. The loop is lowered at a rate of 12 inches per minute into contact with the test substrate, relying on the stiffness of the facestock to regulate the force applied. Immediately, the label is removed, also at the rate of 12 inches per minute, and the peak force required to remove the label is measured and considered the Tack value in unit of pli. The test evaluates how quickly the adhesive can wet out the test substrate and establish bonding.

Edge Ooze

Under standard controlled conditions ((50% RH and 25° C.), a 100 cm$^2$ circular section of the adhesive layer coated on a siliconized release liner is due-cut, detached from the liner and rolled into a spherical shape. The adhesive sphere is first sandwiched between two 1-in×1-in×5 mil thick Mylar films. The sandwich is then placed between two 6-in×6-in× ⅛-in thick glass plates that are preheated in an oven at 69° C. A 1-kg weight is rested on top of the glass plates to promote the adhesive sphere to spread outwardly and become a disk. The final area of the adhesive disk is measured after 5 minutes at 69° C. by averaging the diameters in four evenly distributed directions.

Dynamic Mechanical Analysis (DMA)

Temperature sweep measurements of the adhesive mechanical properties can be performed using the standard operation procedure of the DMA device (Rheometrics) ™ RDA-II). The storage modulus (G'), the loss modulus (G") and hence their ratio (tan δ=G"/G') of the adhesive are measured as functions of temperature ranging from, e.g., −60° C. to 200° C. at a frequency of 10 rad./second. First, the adhesive is poured on a plastic release liner and air dried for 1 week before it is placed in a heated vacuum over at 70° C., 10$^{-2}$ torr for 48 hours. The dried adhesive is then cut into about 1-inch$^2$ pieces and stacked up to form a slab with thickness above 2 mm. The adhesive slab is pressed in a heated press at 70° C. with the use of shim stocks of pre-determined thickness between the press head and the supporting plate to ensure proper adhesive thickness (e.g., 2 mm. The test reveals the adhesive's viscoelastic properties, which can be related to the adhesive performance, as well as other physical properties (e.g., stiffness, adhesive flow at elevated temperatures, moduli at high frequencies for die-cutting, etc.).

The adhesive performance of the constructions of some of the Examples is evaluated using the Loop Tack and Peel Adhesion tests. The failure modes are also recorded to further understand the adhesive properties as where the failure occurred and what caused the failure. To evaluate the advantage of higher stiffness for reduced adhesive flow, Edge Ooze Test is also performed on some of the examples. The results are presented in Table IX.

TABLE IX

Multilayer Adhesive Performance

| Ex-ample | Loop Tack on HDPE[a] | | Peel Adhesion on HDPE[a] | | Edge Ooze on Glass |
| --- | --- | --- | --- | --- | --- |
| | Tack (pli[b]) | Mode[c] | Peel (pli[b]) | Mode[c] | Spread Area (mm$^2$) |
| C-1 | 3.1 | jp | 1.5 | jp | 326 |
| C-2 | 2.0 | c, sp | exc[d] | ft | 200 |
| 1 | 2.4 | ft, sp | exc[d] | ft | — |
| 2 | 0.3 | c | — | — | — |
| 3 | 2.2 | sp | — | — | — |
| 4 | 2.4 | c | — | — | — |
| 5 | 0.3 | c | 0.9 | jp | — |
| 6 | 3.5 | c | exc[d] | ft | — |
| C-3 | 0.8 | c | 0.7 | c,jp | — |
| 7 | 2.6 | sp | exc[d] | ft | — |
| C-4 | 2.9 | c | — | — | — |
| C-5 | 1.1 | sp | — | — | — |
| 8 | 2.6 | sp | — | — | — |
| 9 | 3.0 | c | — | — | — |

[a]High-density polyethylene (HDPE) ⅛" - thick panels from Cadillac Plastics.
[b]pli = pounds per linear inch = 175 N/m.
[c]Failure Modes: c - clean, sp - slight pick (small areas of adhesive delamination from facestock), ft - face tear (facestock failure), jp - jerky peel (stop and go).
[d]Exceeded the facestock strength (face tear), indicating strong adhesive performance.

Despite of the rather aggressive loading (25 to 100 phr) of the fillers, the multilayer adhesive constructions with an unfilled surface layer (Examples 1, 3, 4, and 6–9) showed significant increase in tack performance over the comparable counterparts (Examples C-2, C-3, and 5). The cost advantage is very significant in Example 3 where a total of only 15 g/m$^2$ of adhesive was used in the dual layer construction, a reduction of 25% in adhesive cost can be achieved with sustained tack performance.

When an unfilled anchor layer is used between the facestock and the composite layer (Examples 2, 4, 5 and 9), the failure mode is clean, indicating good adhesion of the composite layer to the facestock. Such constructions without the surface layer will give a removable adhesive label property with low adhesion to the application substrates, allowing the label to be repositioned or cleanly removed from the substrate.

In Examples 1–9 all LSA and FSA layers, when present, are unfilled for best performance gains. However, studies have found using a small amount of filler in the FSA and/or LSA layers will not cause significant change in the physical properties of the adhesive. In C-4, a 24 g/m$^2$ single-layer coating of adhesive blended with 7 phr silica has a Loop Tack value of 2.9 pli on HDPE. Using such slightly filled adhesives as the LSA or FSA layers will have similar improvement for the composite adhesives.

In many aspects of the PSA label applications, adhesive flow or bleed from the label edges is not favorable. In laser printing technology, the PSA label sheets are fed through one or several heated (e.g., 90° C.) rollers in the laser printer. It becomes a great challenge for the PSA to maintain its integrity at elevated temperatures and not to have any edge bleed, which will leave adhesive residues on the rollers and causes eventual paper jam in the printer. Simply increasing the stiffness of the adhesive in a single layer construction may not be a solution as the adhesive quickly loses its tackiness with increasing stiffness. A multilayer adhesive construction with a thin unfilled LSA layer, and a filled composite adhesive layer such as described in the present invention can be exploited to achieve the best of both worlds—low flow and high tack.

Filler-filled adhesives may have significantly higher modulus, especially at elevated temperatures. The deformation under pressure, or the adhesive flow at higher temperatures will be much reduced by incorporating fillers in the adhesive. To evaluate the effect of increased stiffness on the adhesive flow, several blends of the adhesive and a filler are made using the method described above with regard to en evaluated using the DMA test. The results are presented in Table X.

TABLE X

Adhesive Rheology - Stiffness

| Mechanical Properties (by DMA) of Filled Adhesive-SK | Blend 1 | Blend 2 | Blend 3 | Blend 4 |
| --- | --- | --- | --- | --- |
| Filler Type | CaCO$_3$ | ZnO | TiO$_2$ | — |
| Loading (phr) | 100 | 25 | 20 | — |
| Properties at −25° C. | | | | |
| Storage Modulus (G'), dyne/cm$^2$ | 4.0E9 | 2.5E9 | 2.7E9 | 2.4E9 |
| Loss Modulus (G"), dyne/cm$^2$ | 3.4E8 | 2.0E8 | 3.1E8 | 3.0E8 |
| Tan δ - G"/G' | 0.08 | 0.08 | 0.1 | 0.1 |
| Properties at 25° C. | | | | |
| Storage Modulus (G') dyne/cm$^2$ | 3.4E6 | 2.0E6 | 1.2E6 | 8.5E5 |
| Loss Modulus (G"), dyne/cm$^2$ | 2.9E6 | 1.5E6 | 1.2E6 | 8.0E5 |
| Tan δ = G"/G' | 0.8 | 0.8 | 1.0 | 0.9 |
| Properties at 69° C. | | | | |
| Storage Modulus (G'), dyne/cm$^2$ | 7.0E5 | 3.2E5 | 1.7E5 | 1.1E5 |
| Loss Modulus (G"), dyne/cm$^2$ | 3.0E5 | 2.0E5 | 1.2E5 | 7.4E4 |
| Tan δ = G"/G' | 0.4 | 0.6 | 0.7 | 0.7 |
| Properties at 120° C. | | | | |
| Storage Modulus (G'), dyne/cm$^2$ | 3.6E5 | 1.0E5 | 6.7E4 | 3.7E4 |
| Loss Modulus (G"), dyne/cm$^2$ | 1.1E4 | 5.0E4 | 3.7E4 | 2.1E4 |
| Tan δ = G"/G' | 0.3 | 0.5 | 0.6 | 0.6 |

The stiffness of the filled composite adhesive is increased significantly so that the adhesive flow at room or elevated temperatures can be effectively reduced. This indicates that a multilayer PSA construction of this invention will have a reduced adhesive ooze from the edges of the adhesive label, thus enhancing its printing performance with less adhesive build up in the lazer printers and prolonged shelf life.

Drying of pressure-sensitive adhesives involves removal of the volatiles in the coating and is usually the slowest production step in the label stock manufacturing. Initially, in the so-called constant rate drying period, the liquid evaporates rapidly from the coating surface, which is still saturated with liquid. The following stage is called the falling rate drying period as soon as the coating surface solidifies to form a dry skin. Liquid evaporation depends upon diffusion or capillary flow around or through the adhesive particles or polymer domains. The onset of the dry skin formation and diffusion capability of the liquid through the adhesive polymer domains are the two of the most critical factors in the adhesive drying and the production capability of the coating line.

The presence of filler particles and aggregates keeps open capillaries or channels in the filler-rich regions and shortens the diffusion path length for the diffusing liquid through out the coating including the surface. The onset of the dry skin formation can be delayed and the diffusion of the liquid through the body and especially the surface can be enhanced, resulting a faster overall drying rate.

A dual-layer adhesive having an anchor layer such as in Examples 1, 3, 6, 7 and 9 presents an ideal configuration for enhanced adhesive drying operation. The filled composite adhesive bulk layer (FSA) is coated on top of the unfilled adhesive surface layer (LSA) on the siliconized release liner, allowing rapid drying of the liquid in both layers through the filler-rich composite adhesive layer. In order to validify this concept, two single layers of adhesives are coated on a 2 mil polyester film using the method P-1. Blend 5 is a single layer of unfilled adhesive as in Example C-1 with initial composition of 13.3 grams of water and 20 grams of solids per square meter. Blend 6 is a composite adhesive layer of the same adhesive with 50 phr $CaCO_3$ and an initial composition of 16 grams of water and 26 grams of solids per square meter. Immediately after coating, when the coating is still wet, a 100 $cm^2$ section is cut out and placed on a scale to monitor the drying process under ambient conditions (25° C., 50% RH). The retain moisture can thus be computed by monitoring the adhesive weight versus time and using the initial water content and subtracting the final dry weight of the coating. The results are presented in Table XI.

TABLE XI

Adhesive drying at 25° C., 50% RH, no circulation

| Time (min) | Blend 5 (Adhesive) | | Blend 6 (Adhesive + 50 phr $CaCO_3$) | |
|---|---|---|---|---|
| | $H_2O$ in Coating (grams) | Retain $H_2O$/ Initial $H_2O$ | $H_2O$ in Coating (grams) | Retain $H_2O$/ Initial $H_2O$ |
| 0 | 0.133 | 100% | 0.160 | 100% |
| 1 | 0.086 | 65% | 0.093 | 58% |
| 2 | 0.059 | 44% | 0.051 | 32% |
| 3 | 0.035 | 26% | 0.029 | 18% |
| 4 | 0.017 | 13% | 0.013 | 8% |
| 5 | 0.007 | 5% | 0.004 | 2.6% |

From Table XI, Blend 6 contains more initial water in the coating, but it dries more rapidly as compared to the unfilled adhesive, Blend 5. Drying in air without circulation is a slow drying process with minimal dry skin formation on the adhesive surface. In standard production drying process, however, hot air circulating above the adhesive surface will significantly increase the possibility of dry skin formation, hence greatly retarding the adhesive drying. The composite adhesive will show significant improvement of drying rate on the standard production lines due to its open structure.

Direct benefits of fast adhesive drying include higher production speed, lower energy consumption, and more importantly, label lay-flat properties, which are critical in many label applications and have long been the headache of label manufacturing process. The coating surface of the paper release liner tends to expend upon contact with water in the emulsion PSA coating and shrinks upon drying to a different dimension. The degree of curl is a function of the liner property and the soaking time when the paper liner is in contact with the emulsion PSA coating before it is completely dried. The higher drying rate of the composite PSAs in the present invention will significantly reduce this soaking time and lead to much less irreversible deformation of the paper liner. Higher stiffness provided by the fillers will further enhance the lay-flat capabilities of the PSA labels.

It is known to the adhesive label converting industry that the incorporation of fillers in the pressure-sensitive adhesives generally will enhance the die-cutting properties. The improvement generally includes higher converting speed, less adhesive build-up on the die, and reduced damage to the release liner.

Converting refers to the portion of the label production process where the pressure-sensitive adhesive material is cut into the final shape for the end use of the label. It includes die cutting of the labels on the release liner, inserting perforations and fan folding, punching line feed holes on the edges of the web, cutting web into sheets, etc. In the die cutting process, a cutting surface with sharp edges is pressed against the facestock to cut or burst the facestock and the adhesive, but not the release liner.

Filler-rich regions enhance the ability of the adhesive to crack under pressure. The adhesive under the pressure of the die responds to the high cutting speed with much increased elasticity due to its viscoelastic properties. The fracture of the adhesive is therefore mainly by crack growth ahead of the cutting edge. The tensile or cohesive strength is usually much lower in the filler-rich regions than in the polymer chain entangled or cross-linked regions, resulting in a much reduced fracture energy of the overall adhesive. In other words, the filler-filled adhesive is much easier to cut under high speed operation. As noted earlier it has also been observed that the useful life of a cutting tool can be extended by using soft fillers such as talc and corn starch.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A multilayer pressure-sensitive adhesive construction for labels comprising:
 (A) a multilayer adhesive laminate having an overall thickness of less than about 75 microns and comprising
  (i) at least one composite pressure-sensitive adhesive layer comprising a continuous phase of a pressure-sensitive adhesive and a discontinuous phase of non-adhesive filler particles, filler particle aggregates, or a mixture thereof, and
  (ii) at least one second pressure-sensitive adhesive layer which is in contact with the composite layer and contains no filler or less filler than the composite layer, and
 (B) a facestock which is in contact with and adhered to either the composite layer or the second pressure-sensitive adhesive layer of the multilayer adhesive laminate.

2. The construction of claim 1 wherein the filler comprises organic filler particles.

3. The construction of claim 1 wherein the filler comprises inorganic filler particles.

4. The construction of claim 1 wherein the overall thickness of the multilayer adhesive laminate is from about 5 to about 75 microns.

5. The construction of claim 1 wherein the overall thickness of the multilayer adhesive laminate is less than about 50 microns.

6. The construction of claim 1 wherein the composite pressure-sensitive adhesive layer contains from about 1 to about 500 phr of filler particles.

7. The construction of claim 1 wherein the composite pressure-sensitive adhesive layer contains from about 5 to 100 phr of filler particles.

8. The construction of claim 1 wherein the second pressure-sensitive adhesive layer contains from 0 to 20 phr of filler particles.

9. The construction of claim 1 wherein the second pressure-sensitive adhesive layer is substantially free of filler particles.

10. The construction of claim 1 wherein the composite pressure-sensitive adhesive layer contains from about 20 to about 100 phr of filler, and the second pressure-sensitive adhesive layer is substantially free of filler.

11. The construction of claim 1 wherein the composite pressure-sensitive adhesive layer contains from about 20 to about 100 phr of filler, and the second pressure-sensitive adhesive layer contains up to about 20 phr of filler.

12. The construction of claim 1 wherein the thickness of the composite pressure-sensitive layer is from about 1 to about 50 microns and a thickness of the second pressure-sensitive adhesive layer is from about 1 to about 50 microns.

13. The construction of claim 1 also comprising a release liner in contact with is the adhesive layer which is not in contact with the facestock.

14. The construction of claim 1 wherein the facestock is in contact with the second pressure-sensitive adhesive layer.

15. The construction of claim 11 wherein the second pressure-sensitive adhesive layer is in contact with a release liner, and the composite pressure-sensitive adhesive layer is in contact with the facestock.

16. The construction of claim 1 wherein the pressure-sensitive adhesive layers are derived from one or more acrylic-based or rubber-based polymers in emulsion, solvent, or hot melt form.

17. The construction of claim 1 wherein the pressure-sensitive adhesive layers are derived from one or more emulsion acrylic-based adhesives.

18. The construction of claim 1 wherein the filler particles and filler particle aggregates are substantially non-tacky materials having particle diameters ranging from about 0.005 to about 50 microns.

19. The construction of claim 1 wherein the facestock is in adhesive contact with the composite pressure-sensitive adhesive layer.

20. The construction of claim 1 wherein the facestock is in adhesive contact with a second pressure-sensitive adhesive layer.

21. The construction of claim 1 wherein the thickness of the second pressure-sensitive adhesive layer is less than the thickness of the composite adhesive layer.

22. The construction of claim 1 wherein the pressure-sensitive adhesive in the composite adhesive layer is different from the pressure-sensitive adhesive in the second pressure-sensitive adhesive layer.

23. The construction of claim 1 wherein the pressure-sensitive adhesive in the composite adhesive layer is the same as the pressure-sensitive adhesive in the second pressure-sensitive adhesive layer.

24. The construction of claim 1 wherein the filler particles and filler particle aggregates comprise a mixture of different inorganic particles.

25. The construction of claim 1 wherein the filler particles and filler particle aggregates comprise a mixture of inorganic and organic particles.

26. The construction of claim 1 wherein the filler particles or filler particle aggregates, if present in the second pressure sensitive adhesive layer, are different from the filler particles or filler particle aggregates in the composite pressure sensitive adhesive layer.

27. A multilayer pressure-sensitive adhesive construction for labels comprising (A) a multilayer adhesive laminate having an overall thickness of less than about 50 microns and comprising
  (i) at least one composite pressure-sensitive adhesive layer comprising a continuous phase of a pressure-sensitive adhesive and a discontinuous phase of inorganic filler particles, inorganic filler particle aggregates or a mixture thereof, and
  (ii) at least one second pressure-sensitive adhesive layer wherein said second pressure-sensitive adhesive layer is in contact with the composite pressure-sensitive adhesive layer and contains from 0 to about 20 phr of filler, provided the amount of filler in the second adhesive layer is less than the amount of filler in the composite layer, and
(B) a facestock which is in contact with and adhered to either a composite layer or a second pressure-sensitive adhesive layer of the multilayer adhesive laminate.

28. The construction of claim 27 wherein the composite pressure-sensitive adhesive layer contains from about 20 to about 100 phr of filler, and the second pressure-sensitive adhesive layer is substantially free of filler.

29. The construction of claim 27 wherein the second pressure-sensitive adhesive layer is in contact with the facestock, and the composite pressure-sensitive adhesive layer is in contact with a release liner.

30. The construction of claim 27 wherein the second pressure-sensitive adhesive layer is in contact with a release liner, and the composite pressure-sensitive adhesive layer is in contact with the facestock.

31. The construction of claim 27 wherein the pressure-sensitive adhesive layers are derived from emulsions of one or more acrylic-based or rubber-based polymers.

32. The construction of claim 27 wherein the pressure-sensitive adhesive layers are derived from emulsions of one or more acrylic-based adhesives.

33. The construction of claim 27 wherein the thickness of the second pressure-sensitive adhesive layer is less than the thickness of the composite adhesive layer.

34. A multilayer pressure-sensitive adhesive construction for labels comprising:

(A) a multilayer adhesive laminate having an overall thickness of less than about 75 microns and comprising
  (i) a composite pressure-sensitive adhesive layer comprising a continuous phase of a pressure-sensitive adhesive and a discontinuous phase of non-adhesive filler particles, filler particle aggregates, or a mixture thereof, and
  (ii) second pressure-sensitive adhesive layers on each side of the composite pressure-sensitive adhesive layer and which contain no filler or less filler than the composite layer, and
(B) a facestock which is in contact with and adhered to one of the second pressure-sensitive adhesive layers of the multilayer adhesive laminate.

35. The construction of claim 34 wherein the filler comprises organic filler particles.

36. The construction of claim 34 wherein the filler comprises inorganic filler particles.

37. The construction of claim 34 wherein the overall thickness of the multilayer adhesive laminate is from about 5 to about 75 microns.

38. The construction of claim 34 wherein the overall thickness of the multilayer adhesive laminate is less than about 50 microns.

* * * * *